(12) United States Patent
Rosenberg et al.

(10) Patent No.: US 8,214,462 B1
(45) Date of Patent: Jul. 3, 2012

(54) SYSTEM AND METHOD FOR PROVIDING A PERSONALIZED MEDIA SERVICE

(75) Inventors: Jeremy C. Rosenberg, Havre de Grace, MD (US); Ronald M. Yurman, West Orange, NJ (US)

(73) Assignee: Music Choice, Horsham, PA (US)

( * ) Notice: Subject to any disclaimer, the term of this patent is extended or adjusted under 35 U.S.C. 154(b) by 340 days.

(21) Appl. No.: 12/003,784

(22) Filed: Dec. 31, 2007

Related U.S. Application Data

(63) Continuation of application No. 10/339,425, filed on Jan. 9, 2003, now Pat. No. 7,325,043, which is a continuation-in-part of application No. 10/098,620, filed on Mar. 18, 2002, now Pat. No. 7,783,722, which is a continuation-in-part of application No. 09/800,956, filed on Mar. 8, 2001, now Pat. No. 7,028,082.

(60) Provisional application No. 60/395,360, filed on Jul. 12, 2002, provisional application No. 60/390,312, filed on Jun. 21, 2002, provisional application No. 60/187,894, filed on Mar. 8, 2000.

(51) Int. Cl.
G06F 15/16 (2006.01)
(52) U.S. Cl. ......................... 709/219; 709/231
(58) Field of Classification Search .................. 709/219, 709/231; 84/609; 725/9, 46; 705/14; 455/2.01
See application file for complete search history.

(56) References Cited

U.S. PATENT DOCUMENTS

| | | | |
|---|---|---|---|
| 4,127,796 A | 11/1978 | Henderson | |
| RE29,997 E | 5/1979 | Den Toonder | |
| 4,336,478 A | 6/1982 | Quilty et al. | |
| 4,338,623 A | 7/1982 | Asmus et al. | |
| 4,360,805 A | 11/1982 | Andrews et al. | |
| 4,677,430 A | 6/1987 | Falkman et al. | |
| 4,722,005 A | 1/1988 | Ledenbach | |
| 4,760,455 A | 7/1988 | Nagashima | |
| 4,799,156 A | 1/1989 | Shavit et al. | |
| 4,823,386 A | 4/1989 | Dumbauld | |
| 5,130,615 A | 7/1992 | George | |
| 5,193,006 A | 3/1993 | Yamazaki | |

(Continued)

FOREIGN PATENT DOCUMENTS
EP 1 022 900 A1 7/2000
(Continued)

OTHER PUBLICATIONS

Office Action issued in U.S. Appl. No. 10/098,620 on Apr. 6, 2009, 19 pages.

(Continued)

*Primary Examiner* — Jungwon Chang
(74) *Attorney, Agent, or Firm* — Rothwell, Figg, Ernst & Manbeck, P.C.

(57) ABSTRACT

A system and method for providing a personalized media service. In one aspect, the system includes an on-demand system, a plurality of subscriber devices, and a network to which the on-demand system and the subscriber devices are coupled so that the on-demand system and the subscriber devices can communicate with each other. The on-demand system enables a user to create one or more personalized media channels by enabling the user to specify his/her media preferences for each channel. The on-demand system includes a media server for streaming media to the plurality of subscriber devices. The media is preferably implemented using a video-on-demand server.

28 Claims, 23 Drawing Sheets

U.S. PATENT DOCUMENTS

| | | | |
|---|---|---|---|
| 5,235,680 A | 8/1993 | Bijnagte | |
| 5,315,448 A | 5/1994 | Ryan | |
| 5,341,350 A | 8/1994 | Frank et al. | |
| 5,355,302 A | 10/1994 | Martin et al. | |
| 5,365,381 A | 11/1994 | Scheffler | |
| 5,371,551 A | 12/1994 | Logan et al. | |
| 5,418,654 A | 5/1995 | Scheffler | |
| 5,420,838 A | 5/1995 | Maeda et al. | |
| 5,481,296 A | 1/1996 | Cragun et al. | |
| 5,534,911 A | 7/1996 | Levitan | |
| 5,550,863 A | 8/1996 | Yurt et al. | |
| 5,557,541 A | 9/1996 | Schulhof et al. | 364/514 |
| 5,572,442 A | 11/1996 | Schulhof et al. | 364/514 |
| 5,585,866 A | 12/1996 | Miller et al. | |
| 5,590,282 A | 12/1996 | Clynes | |
| 5,592,511 A | 1/1997 | Schoen et al. | |
| 5,616,876 A | 4/1997 | Cluts | 84/609 |
| 5,617,565 A | 4/1997 | Augenbraun et al. | |
| 5,629,867 A | 5/1997 | Goldman | |
| 5,635,989 A | 6/1997 | Rothmuller | |
| 5,636,276 A | 6/1997 | Brugger | |
| 5,646,992 A | 7/1997 | Subler | |
| 5,675,734 A | 10/1997 | Hair | |
| 5,708,780 A | 1/1998 | Levergood et al. | |
| 5,721,815 A | 2/1998 | Ottesen et al. | 395/200.09 |
| 5,726,909 A | 3/1998 | Krikorian | 364/514 |
| 5,734,719 A | 3/1998 | Tsevdos et al. | |
| 5,734,961 A | 3/1998 | Castille | |
| 5,751,282 A | 5/1998 | Girard et al. | 345/327 |
| 5,751,806 A | 5/1998 | Ryan | |
| 5,753,844 A | 5/1998 | Matsumoto | |
| 5,754,939 A | 5/1998 | Herz et al. | |
| 5,761,606 A | 6/1998 | Wolzien | |
| 5,761,607 A | 6/1998 | Gudesen | |
| 5,761,662 A | 6/1998 | Dasan | |
| 5,771,435 A | 6/1998 | Brown | |
| 5,781,889 A | 7/1998 | Martin et al. | |
| 5,784,095 A | 7/1998 | Robbins et al. | |
| 5,790,935 A | 8/1998 | Payton | 455/5.1 |
| 5,793,980 A | 8/1998 | Glaser et al. | 395/200.61 |
| 5,809,144 A | 9/1998 | Sirbu et al. | |
| 5,809,246 A | 9/1998 | Goldman | |
| 5,819,049 A | 10/1998 | Reietmann | |
| 5,819,160 A | 10/1998 | Foladare et al. | |
| 5,835,487 A | 11/1998 | Campanella | |
| 5,841,979 A | 11/1998 | Schulhof et al. | |
| 5,848,398 A | 12/1998 | Martin et al. | |
| 5,861,906 A | 1/1999 | Dunn et al. | |
| 5,878,141 A | 3/1999 | Daly et al. | |
| 5,890,137 A | 3/1999 | Koreeda | |
| 5,890,139 A | 3/1999 | Suzuki et al. | |
| 5,899,699 A | 5/1999 | Kamiya | 434/307 |
| 5,899,980 A | 5/1999 | Wilf et al. | |
| 5,900,830 A | 5/1999 | Scheffler | |
| 5,913,204 A | 6/1999 | Kelly | |
| 5,918,213 A | 6/1999 | Bernard et al. | |
| 5,926,624 A | 7/1999 | Katz et al. | |
| 5,930,765 A | 7/1999 | Martin et al. | |
| 5,930,768 A | 7/1999 | Hooban | |
| 5,931,901 A | 8/1999 | Wolfe et al. | |
| 5,933,500 A | 8/1999 | Blatter et al. | |
| 5,943,422 A | 8/1999 | Van Wie et al. | |
| 5,944,608 A | 8/1999 | Reed et al. | |
| 5,959,945 A | 9/1999 | Kleiman | |
| 5,960,411 A | 9/1999 | Hartman et al. | |
| 5,968,120 A | 10/1999 | Guedalia | |
| 5,969,283 A | 10/1999 | Looney et al. | |
| 5,970,474 A | 10/1999 | LeRoy et al. | |
| 5,973,722 A | 10/1999 | Wakai et al. | |
| 5,980,261 A | 11/1999 | Mino et al. | |
| 5,983,069 A | 11/1999 | Cho et al. | |
| 5,986,692 A | 11/1999 | Logan et al. | |
| 5,991,374 A | 11/1999 | Hazenfield | |
| 5,991,737 A | 11/1999 | Chen | |
| 6,005,597 A * | 12/1999 | Barrett et al. | 725/46 |
| 6,011,761 A | 1/2000 | Inoue | |
| 6,011,854 A | 1/2000 | Van Ryzin | |
| 6,020,883 A | 2/2000 | Herz et al. | |
| 6,021,432 A | 2/2000 | Sizer et al. | |
| 6,025,868 A | 2/2000 | Russo | |
| 6,038,591 A | 3/2000 | Wolfe et al. | |
| 6,055,314 A | 4/2000 | Spies et al. | |
| 6,055,566 A | 4/2000 | Kikinis | |
| 6,085,235 A | 7/2000 | Clarke et al. | |
| 6,088,455 A | 7/2000 | Logan et al. | |
| 6,088,722 A | 7/2000 | Herz et al. | 709/217 |
| 6,105,060 A | 8/2000 | Rothblatt | |
| 6,135,646 A | 10/2000 | Kahn et al. | |
| 6,141,488 A | 10/2000 | Knudson et al. | |
| 6,151,634 A | 11/2000 | Glaser et al. | 709/236 |
| 6,154,772 A | 11/2000 | Dunn et al. | |
| 6,161,142 A | 12/2000 | Wolfe et al. | |
| 6,192,340 B1 | 2/2001 | Abecassis | 704/270 |
| 6,223,210 B1 | 4/2001 | Hickey | |
| 6,223,292 B1 | 4/2001 | Dean et al. | |
| 6,226,030 B1 | 5/2001 | Harvey et al. | |
| 6,226,618 B1 | 5/2001 | Downs et al. | |
| 6,229,895 B1 | 5/2001 | Son et al. | 380/200 |
| 6,232,539 B1 | 5/2001 | Looney et al. | |
| 6,233,682 B1 | 5/2001 | Fritsch | |
| 6,240,553 B1 | 5/2001 | Son et al. | 725/95 |
| 6,243,725 B1 | 6/2001 | Hempleman et al. | |
| 6,246,672 B1 | 6/2001 | Lumelsky | |
| 6,248,946 B1 * | 6/2001 | Dwek | 84/609 |
| 6,249,810 B1 | 6/2001 | Kiraly | 709/217 |
| 6,253,235 B1 | 6/2001 | Estes | 709/217 |
| 6,253,237 B1 | 6/2001 | Story et al. | |
| 6,253,246 B1 | 6/2001 | Nakatsuyama | |
| 6,262,772 B1 | 7/2001 | Shen et al. | |
| 6,279,040 B1 | 8/2001 | Ma et al. | 709/231 |
| 6,286,139 B1 | 9/2001 | Decingue | |
| 6,287,124 B1 | 9/2001 | Yamaura et al. | |
| 6,305,020 B1 | 10/2001 | Hoarty et al. | 725/95 |
| 6,324,217 B1 | 11/2001 | Gordon | |
| 6,330,595 B1 | 12/2001 | Ullman et al. | |
| 6,330,609 B1 | 12/2001 | Garofalakis et al. | 709/229 |
| 6,338,044 B1 | 1/2002 | Cook et al. | |
| 6,351,442 B1 | 2/2002 | Tagawa et al. | |
| 6,356,971 B1 | 3/2002 | Katz et al. | |
| 6,369,851 B1 | 4/2002 | Marflak et al. | |
| 6,389,467 B1 | 5/2002 | Eyal | |
| 6,393,430 B1 | 5/2002 | Van Ryzin | |
| 6,418,421 B1 | 7/2002 | Hurtado et al. | |
| 6,434,621 B1 | 8/2002 | Pezzillo et al. | |
| 6,434,747 B1 | 8/2002 | Khoo et al. | |
| 6,445,306 B1 | 9/2002 | Trovato | |
| 6,446,080 B1 | 9/2002 | Van Ryzin | |
| 6,446,130 B1 | 9/2002 | Grapes | |
| 6,490,728 B1 | 12/2002 | Kitazato et al. | |
| 6,505,240 B1 | 1/2003 | Blumenau | |
| 6,507,727 B1 | 1/2003 | Henrick | |
| 6,526,411 B1 | 2/2003 | Ward | |
| 6,529,946 B2 | 3/2003 | Yokono et al. | |
| 6,530,082 B1 * | 3/2003 | Del Sesto et al. | 725/9 |
| 6,550,011 B1 | 4/2003 | Sims, III | |
| 6,587,127 B1 | 7/2003 | Leeke et al. | |
| 6,587,837 B1 | 7/2003 | Spagna et al. | |
| 6,611,813 B1 | 8/2003 | Bratton | |
| 6,647,417 B1 | 11/2003 | Hunter et al. | |
| 6,674,993 B1 * | 1/2004 | Tarbouriech | 455/2.01 |
| 6,701,355 B1 * | 3/2004 | Brandt et al. | 709/219 |
| 6,748,237 B1 | 6/2004 | Bates et al. | |
| 6,748,427 B2 | 6/2004 | Drosset et al. | |
| 6,766,357 B1 | 7/2004 | Fandozzi | |
| 6,782,550 B1 | 8/2004 | Cao | |
| 6,789,106 B2 | 9/2004 | Eyer | |
| 6,792,280 B1 | 9/2004 | Hori et al. | |
| 6,823,225 B1 | 11/2004 | Sass | |
| 6,842,604 B1 | 1/2005 | Cook | |
| 6,856,550 B2 | 2/2005 | Kato et al. | |
| 6,865,550 B1 | 3/2005 | Cok | |
| 6,898,800 B2 | 5/2005 | Son et al. | |
| 6,910,220 B2 | 6/2005 | Hickey | |
| 6,925,489 B1 | 8/2005 | Curtin | |
| 6,933,433 B1 | 8/2005 | Porteus et al. | |
| 6,959,220 B1 | 10/2005 | Wiser et al. | |
| 6,985,694 B1 | 1/2006 | De Bonet | |

| | | | |
|---|---|---|---|
| 7,010,492 B1 | 3/2006 | Bassett et al. | |
| 7,020,888 B2 | 3/2006 | Reynolds et al. | |
| 7,024,678 B2 | 4/2006 | Gordon et al. | |
| 7,028,082 B1 | 4/2006 | Rosenberg et al. | |
| 7,054,547 B1 | 5/2006 | Abecassis | |
| 7,065,287 B1 | 6/2006 | Heredia et al. | |
| 7,076,561 B1 | 7/2006 | Rosenberg et al. | |
| 7,111,099 B2 | 9/2006 | Alexander | |
| 7,133,924 B1 | 11/2006 | Rosenberg et al. | |
| 7,149,471 B1 | 12/2006 | Arisawa et al. | |
| 7,181,297 B1 | 2/2007 | Pluvinage et al. | |
| 7,185,355 B1 | 2/2007 | Ellis et al. | |
| 7,209,892 B1 | 4/2007 | Galuten et al. | |
| 7,321,923 B1 | 1/2008 | Rosenberg | |
| 7,325,043 B1 | 1/2008 | Rosenberg | |
| 7,343,179 B1 | 3/2008 | Theis et al. | |
| 7,370,016 B1 | 5/2008 | Hunter et al. | |
| 7,555,539 B1 | 6/2009 | Rosenberg | |
| 7,657,910 B1 | 2/2010 | McAulay et al. | |
| 7,711,838 B1 | 5/2010 | Boulter et al. | |
| 7,797,446 B2 | 9/2010 | Heller et al. | |
| 2001/0032312 A1 | 10/2001 | Runje et al. | |
| 2001/0042107 A1 | 11/2001 | Palm | 709/218 |
| 2001/0049826 A1 | 12/2001 | Wilf | |
| 2002/0021708 A1 | 2/2002 | Ishiai | |
| 2002/0023164 A1 | 2/2002 | Lahr | 709/231 |
| 2002/0023166 A1 | 2/2002 | Bar-Noy et al. | 709/231 |
| 2002/0032728 A1 | 3/2002 | Sako et al. | 709/203 |
| 2002/0038359 A1 | 3/2002 | Ihara et al. | 709/219 |
| 2002/0046084 A1* | 4/2002 | Steele et al. | 705/14 |
| 2002/0056117 A1 | 5/2002 | Hasegawa et al. | 725/86 |
| 2002/0056118 A1 | 5/2002 | Hunter et al. | 725/87 |
| 2002/0059363 A1 | 5/2002 | Katz et al. | |
| 2002/0059621 A1 | 5/2002 | Thomas et al. | 725/87 |
| 2002/0062261 A1 | 5/2002 | Mukai | 705/26 |
| 2002/0083148 A1 | 6/2002 | Shaw et al. | |
| 2002/0138630 A1 | 9/2002 | Solomon et al. | |
| 2002/0147634 A1 | 10/2002 | Jacoby et al. | |
| 2002/0152278 A1 | 10/2002 | Pontenzone et al. | |
| 2002/0194260 A1 | 12/2002 | Headley et al. | |
| 2002/0194619 A1 | 12/2002 | Chang et al. | |
| 2003/0023975 A1 | 1/2003 | Schrader et al. | |
| 2003/0050058 A1 | 3/2003 | Walsh et al. | |
| 2003/0097338 A1 | 5/2003 | Mankovich | |
| 2003/0126595 A1 | 7/2003 | Sie | |
| 2003/0135464 A1 | 7/2003 | Mourad | |
| 2003/0182184 A1 | 9/2003 | Strasnick | |
| 2003/0187739 A1 | 10/2003 | Powers | |
| 2006/0173974 A1 | 8/2006 | Tang | |

FOREIGN PATENT DOCUMENTS

| | | |
|---|---|---|
| WO | WO 97/37492 A1 | 10/1997 |
| WO | WO 99/17230 A1 | 4/1999 |
| WO | WO 99/48296 A1 | 9/1999 |
| WO | WO 00/07368 | 2/2000 |
| WO | WO 01/35874 A1 | 5/2001 |
| WO | WO 01/36064 A1 | 5/2001 |

OTHER PUBLICATIONS

Office Action issued in U.S. Appl. No. 10/098,620 on Nov. 3, 2008, 21 pages.
Bemotas, Adolphe V., "Computers and TV: Marriage of the Future", St. Louis Post Dispatch, Oct. 11, 1995, 1 page.
Sweeney, John, "An introduction to interactive television", International Broadcasting Convention, 1994, 10 pages.
United States Code Service, 17 USSC § 114, Scope of exclusive rights in sound recordings, 2000, 12 pages.
Office Action issued in U.S. Appl. No. 11/928,904 on Aug. 19, 2009, 10 pages.
Office Action issued on Aug. 19, 2009 in U.S. Appl. No. 11/928,904, 9 pages.
Office Action issued on Sep. 4, 2009 in U.S. Appl. No. 11/783,426, 11 pages.
Shareware Music Machine News, Shareware Music Machine.com, "MusicMatch Jukebox 6.0 gets personal", Press Release, Oct. 6, 2000, 4 pages.
Welz, Gary, Integrated Streaming Technologies, Oct. 30, 1996, www.webdeveloper.cm/multimedi/multimedi_web/96/mw961030.html.
Rajapakshe, Harindra, Quek, Derek Paul, Video on Demand, Jun. 1995, http://www.doc.ic.oc.uk/~nd/surprise_95/journ1/v14/shr/report.html.
6 Pages from the web site for www.request.com.
Clark D., ClickRadio to Start Digital Music Services, WSJ Interactive Edition, 2000.
"ClickRadio granted first interactive radio license by universal music group; . . . ," www.clickradio.com, printed Apr. 20, 2000.
Gordon, C., "ClickRradio sidesteps competition with music licensing deals," Atnewyork.com., May 12, 2000.
"Phillips showcases clickradio on digital set-top at western show 2000; . . . ," Business Wire, Inc., Nov. 29, 2000.
Web site for www.sonicnet.com., printed Jun. 22, 2004, 6 pages.
Bower, "Digital Radio—A Revolution for In-Car Entertainment," Proc. NavPos Automative '98 Conf. vol. 2, Session 5-8, 10 pages, Jun. 10, 1998.
Radio Authority, Digital Radio Fact Sheet No. 4, 1999. http://www.radioauthority.org.uk/Information/Fact_Sheets/fs4.htm, 5 pages.
"The ICTV Digital Broadband System, " ICTV, Inc. White Paper, 2000, 11 pages.
"Sonicbox brings Net radio into your living room," (Partyka, Jeff. Oct. 12, 1999. CNN.com), 3 pages.
"Internet Radio Listeners Unchained From Their PCs," (Olenick, Doug. Oct. 25, 1999. Twice Computer Technology), 1 page.
"Sonicbox and Microsoft Bring Windows Media Internet Radio to the Home Stereo," (Dec. 7, 1999 Microsoft Press Release), 3 pages.
King, "Tune on, Tune in, Drop Cash" Dec. 8, 2000, Wired News, 4 pages.
"Global Media Announces Launch of Independent Internet Radio station,"; News Release, Feb. 1, 1999, 2 pages.
"Platinum Entertainment and Liquid Audio Join Forces to Offer Extensive Music Catalog via Digital Downloads", Press Relaese, Jul. 15, 1998, 2 pages.
LaFrance, "Thinking Globally with a web-based radio station vying for listeners around the world, homegrown internet company fastband aims to shake up the music world", Times Picayune, Nov. 4, 1999, 2 pages.
"Tune into Yahoo! Radio," Yahoo Media Relations Press Release, Yahoo! teams up with Broadcast.com and Spinner.com to Provide 10 stations of Audio Programming, May 11, 1999, 2 pages.
Yahoo Offers one-stop shop for e-music, Milwaulkee Journal Sentinel (Wisconsin), Aug. 25, 1999, 1 page.
uniView Technologies Now in Yahoo!'s Multicast Affiliate Program, Press Release Newswire Association,. Inc., Oct. 19, 1999, 2 pages.
"WebRadio.com Signs on as Liquid Music Network Affiliate Offering Liquid Audio Digital Downloads," Business Wire, Inc., Sep. 1, 1999, 2 pages.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Set-top box for television that reads your mind," Financial Times Limited, Dec. 30, 1998, 1 page.
Rajapakshe, H. et al., "Video On Demand," Jun. 1995, pp. 1-15.
Welz, G., "Integrated Streaming Technologies, " Oct. 30, 1996, pp. 1-3.
Loeb, S., "Architecting Personalized Delivery of Multimedia Information", Communications of the ACM, Dec. 1992, vol. 35, No. 12, pp. 39-48.
Office Action issued on Aug. 23, 2005 in U.S. Appl. No. 10/098,620, 15 pp.
Office Action issued on Jun. 15, 2006 in U.S. Appl. No. 10/098,620, 14 pp.
Office Action issued on Apr. 4, 2007 in U.S. Appl. No. 10/098,620, 12 pp.
Office Action issued on Mar. 16, 2005 in U.S. Appl. No. 09/800,956, 20 pp.
Office Action issued on May 24, 2005 in U.S. Appl. No. 10/098,482, 10 pp.
Office Action issued on Aug. 30, 2005 in U.S. Appl. No. 10/098,450, 8 pp.

Office Action issued on Aug. 30, 2005 in U.S. Appl. No. 10/098,473, 8 pp.
Office Action issued on Feb. 15, 2006 in U.S. Appl. No. 10/098,482, 12 pp.
Office Action issued on Apr. 18, 2006 in U.S. Appl. No. 10/098,482, 3 pp.
Office Action issued on Nov. 21, 2006 in U.S. Appl. No. 10/098,482, 11 pp.
Office Action issued on Dec. 6, 2006 in U.S. Appl. No. 11/002,181, 10 pp.
Office Action issued on Jun. 8, 2007 in U.S. Appl. No. 11/002,181, 13 pp.
Office Action issued in U.S. Appl. No. 10/098,620, dated Sep. 28, 2007, 19 pp.
Office Action issued on Dec. 31, 2009 in U.S. Appl. No. 11/928,932, 12 pages.
Office Action issued on Nov. 13, 2009 in U.S. Appl. No. 10/098,620, 21 pages.
Decision in *Arista Records, LLC* et al. v. *Launch Media, Inc.*, Case No. 07-2576-cv, United States Court of Appeals for the Second Circuit, decided Aug. 21, 2009, 42 pages.
Office Action issued on Oct. 1, 2010 in U.S. Appl. No. 11/928,959, 13 pages.
Office Action issued on Oct. 6, 2010 in U.S. Appl. No. 12/425,816, 13 pages.
Office Action issued on Oct. 13, 2010 in U.S. Appl. No. 11/928,904, 11 pages.

* cited by examiner

MY MUSIC CHOICE

MY FAVORITES

Rate Your Categories (optional)

You can further define your music mix by rating the categories below.

Press "OK" on the remote to change rating.
+ = Play More     − = Play Less
0 = Don't Play    Blank = No Change Smooth R&B
- ☐ Grooves
- ☐ Love Songs
- ☐ Male Artists
- ☐ Neo Classic Soul
- ☐ Songstress'

Classic R&B
- ☐ '80s
- ☐ Ballads
- ☐ Disco
- ☐ Funk
- ☐ Groups
- ☐ Motown
- ☐ Rhythm & Blues
- ☐ Soul R&B/Hip Hop
- ☐ '90s
- ☐ Ballads
- ☐ Current Hits
- ☐ Hip hop

[ Back ]   [ Customize More ]   [ Exit & Listen ]

FIG. 3C

MY MUSIC CHOICE

MY FAVORITES

Rate Your Artists (optional)

You can rate artists to influence what is played on your channel.

Press "OK" on the remote to change rating.
+ = Play More    − = Play Less
0 = Don't Play    Blank = No Change Smooth R&B
☐ Regina Belle
☐ Eric Benet
☐ Boyz II Men
☐ Toni Braxton
☐ Debarge
☐ Earth Wind&Fire
☐ Phyllis Hyman
☐ James Ingram Classic R&B
☐ James Brown
☐ Cameo
☐ The Delfonics
☐ The Dells
☐ The Four Tops
☐ Aretha Franklin
☐ The Gap Band
☐ Marvin Gaye R&B/Hip Hop
☐ Aaliyah
☐ Erykah Badu
☐ Eric Benet
☐ Brandy
☐ Deborah Cox
☐ D'Angelo
☐ Missy Elliot
☐ Ginuwine

[Back]   [Rate More Artists]   [Exit & Listen]

CREATE/MODIFY A FILTER

CHANNEL NAME: CLASSIC ROCK CHANNEL

Styles:
(SELECT ONE OR MORE Styles to filter)

- ☐ Southern Rock
- ☐ Light Rock
- ☒ Heavy Metal
- ☐ Ballads

FAVORITE ARTISTS: U2, DMB, RADIOHEAD

LEAST FAVORITE ARTISTS:

FAVORITE SONGS:

LEAST FAVORITE SONGS:

DONE — 1090

SYSTEM AND METHOD FOR PROVIDING A PERSONALIZED MEDIA SERVICE

CROSS REFERENCE TO RELATED APPLICATIONS

This application is a continuation of U.S. patent application Ser. No. 10/339,425, filed Jan. 9, 2003 (U.S. Pat. No. 7,325,043), which claims the benefit of U.S. Provisional Patent Application Nos. 60/390,312, filed Jun. 21, 2002 and 60/395,360, filed Jul. 12, 2002; this application and application Ser. No. 10/339,425 is also a continuation-in-part of U.S. patent application Ser. No. 10/098,620, filed on Mar. 18, 2002 (now U.S. Pat. No. 7,783,722), which is a continuation-in-part of U.S. patent application Ser. No. 09/800,956, filed Mar. 8, 2001 (U.S. Pat. No. 7,028,082), which claims the benefit of U.S. Provisional Patent Application No. 60/187,894, filed on Mar. 8, 2000. All of the above mentioned patent applications and patents are assigned to the same assignee as that of the present invention and are incorporated herein by this reference.

FIELD OF THE INVENTION

The present invention is related to systems and methods for providing personalized media services.

BACKGROUND

Broadcasters, such as music broadcasters (e.g., conventional radio stations and other broadcasters of music, video or multimedia works) must accommodate the tastes of a mass audience, and, as we all know, it is not possible to please all of the people all of the time; we each have our own unique likes and dislikes. Consequently, a broadcaster at times may broadcast content that one or more members of the audience may not prefer to consume.

In this example, one solution to this problem is to increase the number of radio stations and/or the number of cable stations that carry music, and thereby increase the likelihood that a listener will find a station that is playing a "good" song. However, this is not a practical solution because there is only a finite amount of bandwidth available to broadcast music, and this bandwidth is already at or near capacity. Further, it is prohibitively expensive to create additional broadcast bandwidth.

SUMMARY OF THE INVENTION

The present invention provides a system and method for providing a personalized media service. A personalized media service is a service that allows a user to have at least some degree of control over the content (e.g., music, video or other content) that is transmitted by the service provider to the user.

In one aspect, a system according to one embodiment of the present invention includes an media-on-demand system, a plurality of subscriber devices, such as set-top boxes and other subscriber devices, and a network to which the media-on-demand system and the subscriber devices are coupled so that the media-on-demand system and the subscriber devices can communicate with each other. The media-on-demand system enables a user to create one or more personalized media channels by enabling the user to specify his/her content preferences for each channel. Each personalized media channel has an associated profile, which stores the user's content preferences for the channel and which is used by the media-on-demand system to create the playlist for the channel. Once a user creates a personalized channel, the user may view or listen to the channel at any time. To view or listen to a personalized channel, the user uses his/her subscriber device to send to the media-on-demand system a request to view or listen to the personalized channel. The request may be sent at any time. In response to receiving the request, the media-on-demand system sequentially streams to the user's subscriber device the works specified in the channel's playlist. The works are stored within the media-on-demand system using mass storage devices, such as disk arrays and other mass storage devices. It should be noted that the media-on-demand system is capable of receiving requests from numerous users and is capable of streaming the same or different works to multiple users at the same time or at overlapping times.

Advantageously, the media-on-demand system includes a media server, which is capable of supplying digital data streams at a constant rate to numerous subscriber devices. Preferably, the media server is implemented using a video-on-demand or video-on-demand type server (hereafter "VOD" server).

Another capability of the media-on-demand system is its ability to create, for each work being streamed, a user interface screen based on the work and/or a user profile and to transmit the user interface screen to the subscriber device, which then displays the screen on an output device coupled to the subscriber device.

As an additional feature, the users are not given any direct control over the playlists associated with their personalized channels. All that the user directly controls are the personalized channel profiles, which give the user indirect control over the playlists. That is, by having direct control over a channel's profile, the user influences which works are included in the channel's playlist. Further, the user is not enabled to view or otherwise determine the contents of the playlists prior to viewing or listening to the playlist. In this example, with these features, viewing or listening to a personalized channel is similar to listening to a conventional radio station in that the user does not know what he or she is going to hear next.

In another embodiment, the users are given direct control over the playlists associated with their personalized channels. That is, by having direct control over a channel's profile, the user influences which works are included in the channel's playlist.

Further, the user is enabled to view or otherwise determine the contents of the playlists prior to viewing or listening to the playlist. In this example, with these features, listening to a personalized channel is similar to listening to a pre-ordered series of tracks on a multi-disc, home compact disc player in that the user knows specifically what he or she is going to hear next.

In another aspect, a system according to one embodiment of the present invention includes a distribution center, a distribution network, and a plurality of subscriber devices. The distribution center includes one or more broadcast signal receiving systems, a media-on-demand system, and a transmission system. The media-on-demand system is operable to receive from a subscriber device a request to view or listen to a personalized channel. After receiving the request, the media-on-demand system selects a work from a collection of works. The selection is preferably based on a profile that is associated with the personalized channel. After selecting the work, the work is retrieved from the storage device on which it is stored and is streamed to the transmission system. The transmission system multiplexes the streamed work with signals transmitted from broadcast signal receiving systems to produce a multiplexed signal. The multiplexed signal is streamed through the distribution network to the plurality of subscriber devices. The subscriber device that transmitted the request to the media-on-demand system retrieves from the multiplexed signal the stream containing the work streamed by the media-on-demand system and provides the work to reproducing equipment so that the user can view, listen to, or otherwise enjoy the work.

In another aspect, a system according to another embodiment of the present invention includes a broadcast media source, a distribution center, a distribution network, and a plurality of subscriber devices. The broadcast media source broadcasts a signal to the distribution center. The signal includes one or more broadcast channels. The distribution center includes one or more broadcast signal receiving systems, a media-on-demand system, and a transmission system. One of the broadcast signal receiving systems receives the signal transmitted by the broadcast media source and retransmits the signal so that it is received by the transmission system and the media-on-demand system. For each channel included in the signal, the media-on-demand system stores in a queue one or more works that were included in the channel. The media-on-demand system is operable to receive from a subscriber device a request to listen to one of the broadcast channels included in the signal transmitted by the broadcast media source. After receiving the request, the media-on-demand system selects a work from the queue associated with the selected channel and determines whether or not to filter the work. If it determines that it should not filter the work, then it streams the work to the subscriber device using the transmission system. If it determines that it should filter the work, then it may select a different work from a collection, and then streams this work to the subscriber device using the transmission system.

The above and other features and advantages of the present invention, as well as the structure and operation of preferred embodiments of the present invention, are described in detail below with reference to the accompanying drawings.

BRIEF DESCRIPTION OF THE DRAWINGS

The accompanying drawings, which are incorporated herein and form part of the specification, illustrate various embodiments of the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

FIGS. 3A-3D illustrate an exemplary user interface that can be used with the present invention.

FIG. 10 illustrates an exemplary form that is used by a user to create a profile for a broadcast channel.

DETAILED DESCRIPTION OF THE PREFERRED EMBODIMENTS

While the present invention may be embodied in many different forms, there is described herein in detail an illustrative embodiment with the understanding that the present disclosure is to be considered as an example of the principles of the invention and is not intended to limit the invention to the illustrated embodiment.

Figure 1:
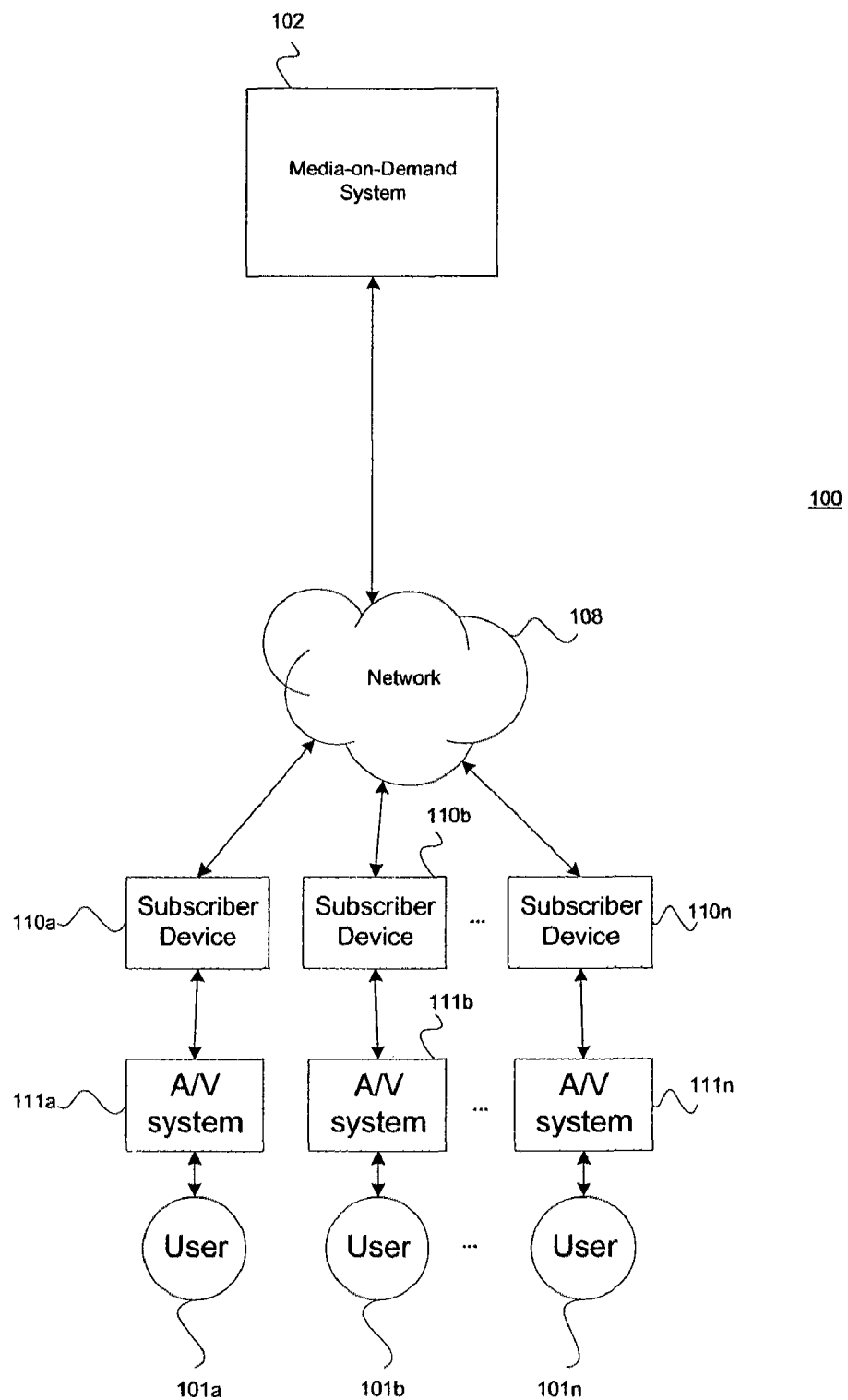
FIG. 1 is a block diagram of a system 100, according to one embodiment of the invention, for providing a personalized media service to numerous users.

FIG. 1 is a block diagram of one embodiment of a system 100 for providing a personalized media service to numerous users 101 $a \ldots n$. System 100 includes a media-on-demand system 102, a network 108, and a plurality of subscriber devices 110 $a \ldots n$. Media-on-demand system 102 and subscriber devices 110 $a \ldots n$ are coupled to network 108 so that media-on-demand system 102 can stream audio or other data to and receive data from subscriber devices 110 $a \ldots n$. Network 108 is preferably a broadband network and may be implemented using the Internet, a cable-tv distribution network, a direct broadcast satellite network, a telephone network, and/or other communications network.

Media-on-demand system 102 is operable to store a large collection of works and to output simultaneously numerous audio, video or other content streams (for example, more than 100 or 1,000) and address each stream to a different subscriber device 110 $a \ldots n$. Additionally, media-on-demand system 102 can generate and transmit an interactive user interface screen to subscriber devices 110 $a \ldots n$, wherein some or all of the contents of the user interface screen transmitted to a subscriber device 110 $a \ldots n$ may be a function of (a) the work that is being streamed to the subscriber device 110 $a \ldots n$, (b) the subscriber device itself, and/or (c) the user 101 $a \ldots n$ who is operating the subscriber device. Subscriber devices 110 $a \ldots n$ are operable to receive the data stream and user interface screen sent from media-on-demand system 102 and then provide the stream and user interface screen to an audio/video system 111 $a \ldots n$, which reproduces the work being streamed for a user to hear and displays the user interface screen for the user to view and interact with. Subscriber devices 110 *a . . . n* may be, for example, a conventional unidirectional or bi-directional set-top box or a general purpose or personal computer, a wireless communication device or a computing device equipped with, at the least, an interface for receiving signals sent through distribution network 108. The subscriber device 110 *a . . . n* may receive signals transmitted through any medium such as a wire, optical, or wireless network. The audio/video system 111 *a . . . n* may include, for example, a conventional television set, stereo system, or computer monitor and speakers.

Figure 2:
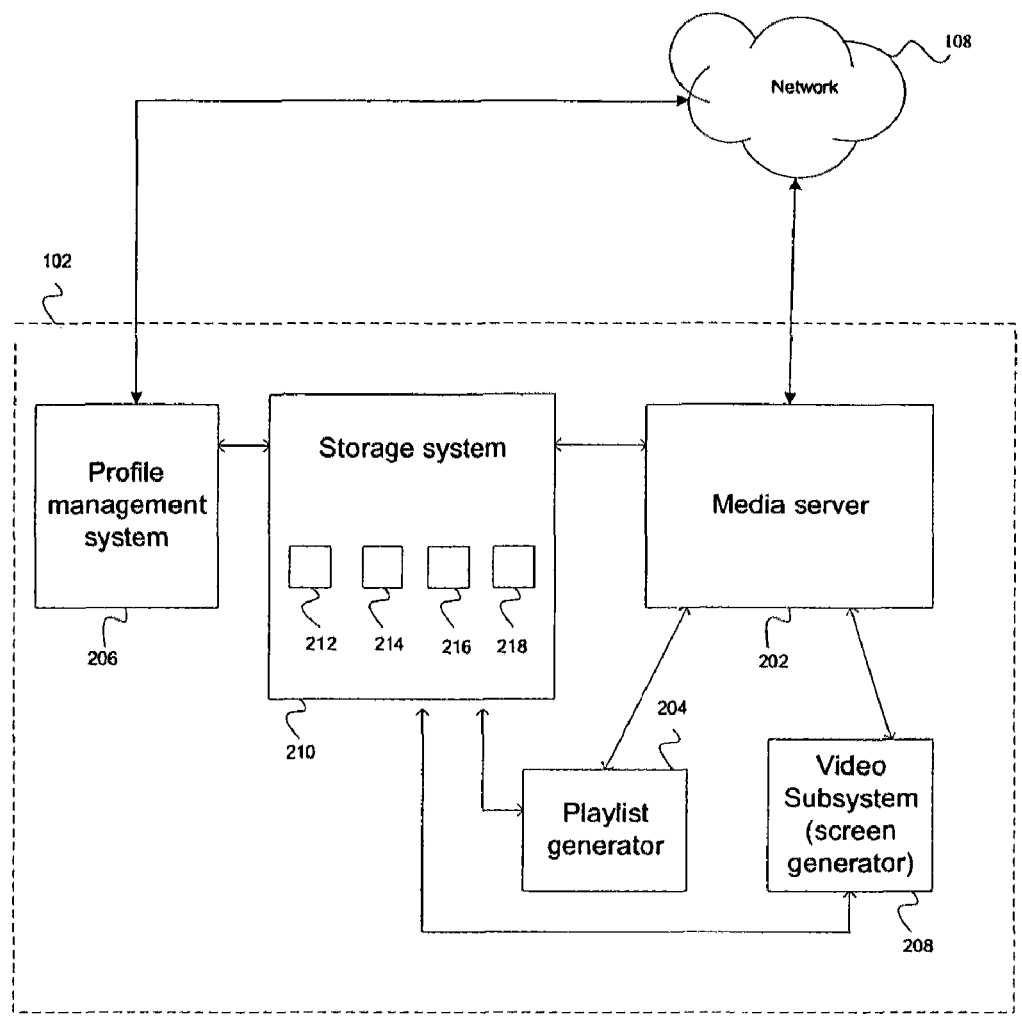
FIG. 2 is a block diagram of one embodiment of the media-on-demand system.
Figure 3A:
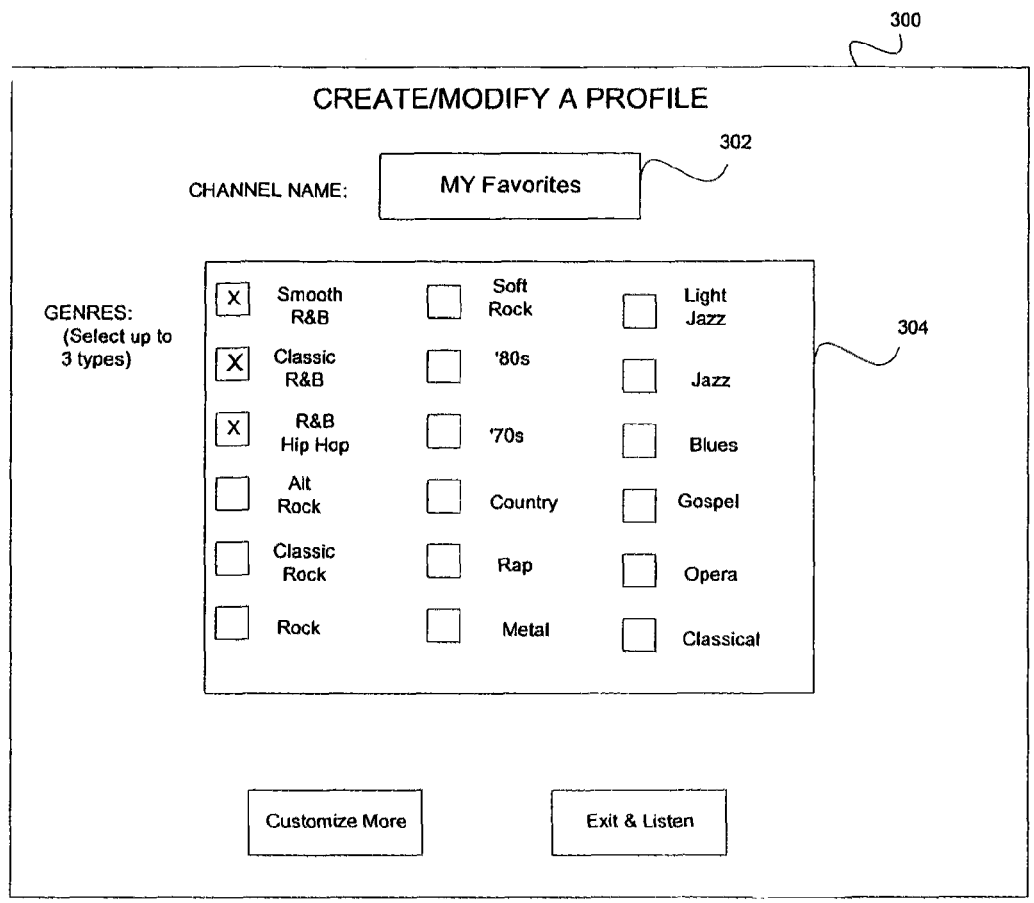
Figure 3B:
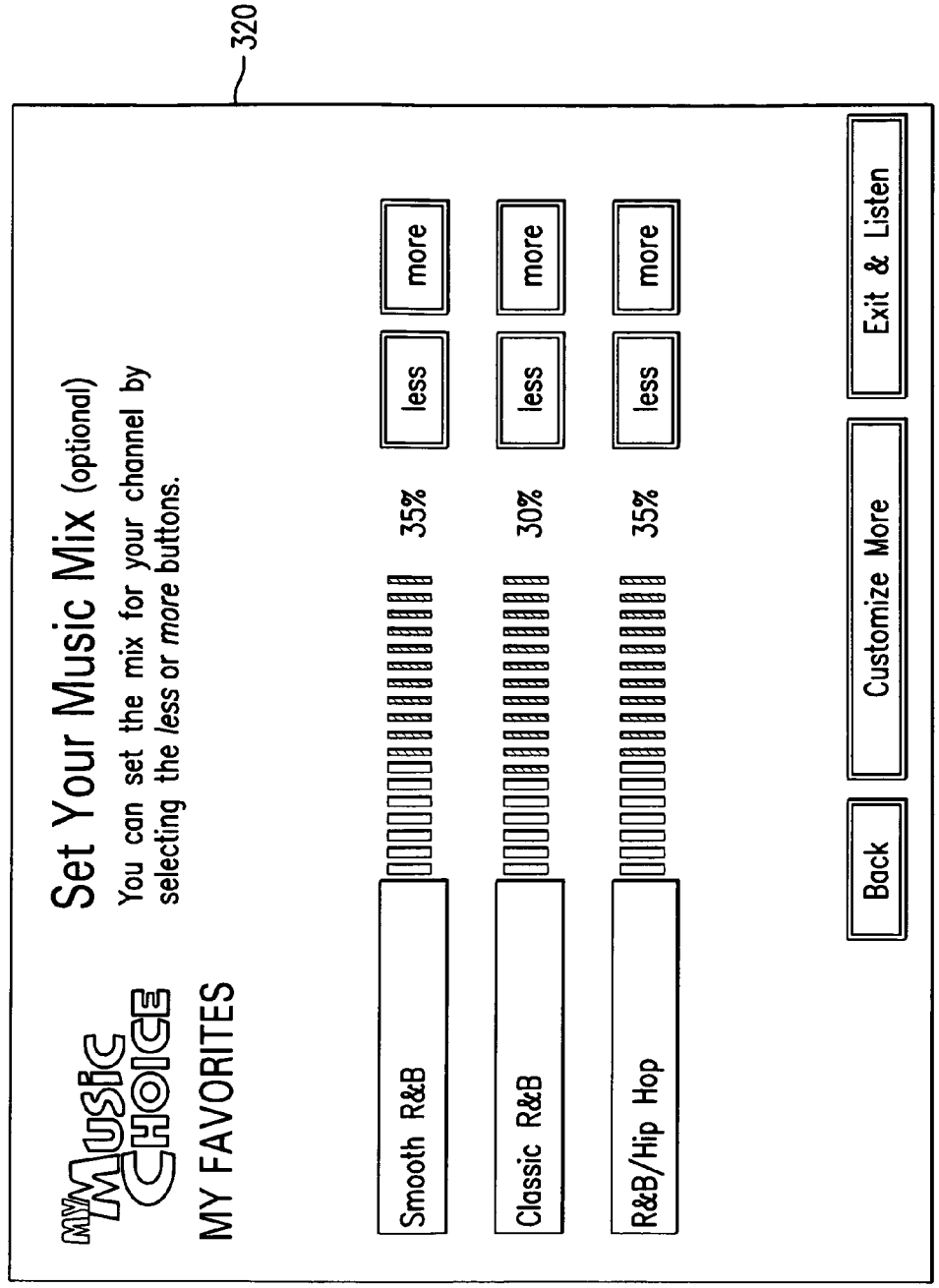

FIG. 2 is a functional block diagram of one embodiment of media-on-demand system 102. As shown in FIG. 2, media-on-demand system 102 may include a media server 202, a playlist generator 204, a channel profile management system 206, a video subsystem 208 (also referred to as "screen generator 208"), and a storage system 210 for storing some or all of the following: channel profiles 212, a collection of works (e.g., sound recordings and/or music videos) 214, a collection of visual media assets 216, and a database 218 for storing information about the works that are included in collection 214. In one embodiment, database 218 stores information about each work in collection 214. This information may include, for example, title, artist, album, genre, and style information concerning the work. One or more computer systems could be used to implement the features of media-on-demand system 102. For example, one or more computer systems could be used to implement media server 202 while one or more other computer systems could be used to implement playlist generator 204, or, for example, one or more computer systems could implement both media server 202 and playlist generator 204. It should be understood that these computers may be co-located or located in several different facilities.

Media server 202 is capable of outputting digital data streams at a constant rate to numerous subscriber devices 110 *a . . . n* simultaneously (e.g., in one embodiment, at least 1,000 subscriber devices 110 *a . . . n*). Media server 202 is preferably implemented using a video-on-demand or video-on-demand type server (hereafter "VOD" server). In one embodiment, media server subscriber devices 110 *a . . . n* can buffer data so that media server 202 does not have to stream at constant rates.

Storage system 210 includes one or more storage devices, such as hard disk drives, CD drives, and/or other storage devices. The storage devices that make up storage system 210 may or may not be co-located, and each storage device may or may not store only one type of information. For example, one storage device may store the works collection 214 while another storage device stores the channel profiles 212. Additionally, works collection 214 may comprise a plurality of libraries, with each library being stored on a storage device in different locations. For example, one library that makes up collection 214 may be stored on a storage device that is co-located with media server 202, while another library that is part of collection 214 may be stored on a storage device that is remote from media server 202. Such a remote media server 202 may be co-located with or within subscriber device 110 *a . . . n*. In another embodiment, remote media server 202 may be co-located with or within an audio/video system 111 *a . . . n*. Additionally, libraries may contain works owned by or licensed to the subscriber as well as works owned by or licensed to the media broadcaster In one embodiment, an initial step in enabling a user (e.g., user 101 *a . . . n*) to listen to his/her own personalized channels is to enable user 101 *a . . . n* to create the personalized channels. User 101 *a . . . n* creates a personalized channel by creating a profile for the personalized channel. In one embodiment, user 101 *a . . . n* creates a personalized channel profile by using a client software application (such as, for example, a conventional web browser) to connect to channel-profile-management system 206. The client may be installed in subscriber device 110 *a . . . n* and use network 108 to communicate with system 206 or the client may be installed on a conventional computer with other network access to system 206.

In the description that follows referencing FIGS. 3A-6D, as an example, the creation and use of a personalized channel will be described with reference to a personalized music channel containing audio-works. It should be understood, however, that this system and description that follows is not limited to audio-works and personalized music channels but may be utilized with any content to create and operate personalized media channels for any particular content and type of work. It should also be understood that the screens shown is FIGS. 3A-3D and 6A-6D are exemplary music channel screens which may be adapted to personalized channels for any other media. In one embodiment after the client establishes a connection with system 206, user 101 *a . . . n* can send a message to system 206 indicating that user 101 *a . . . n* desires to create a personalized audio channel. In response to receiving this message, system 206 transmits a user interface screen 300 (see FIG. 3A) to the client, which displays screen 300 to user 101 *a . . . n*. Screen 300 is a fill-in form that enables user 101 *a . . . n* to create a personalized audio channel by inputting his/her audio-work preferences for the channel.

In filling out screen 300, user 101 *a . . . n* should first name the channel by inputting a name into text box 302. Next, user 101 *a . . . n* should select up to three genres of music to be associated with the channel by selecting the appropriate genre checkboxes that are displayed in section 304. At this point, user 101 *a . . . n* may customize the channel further by selecting the customize-more button or user 101 *a . . . n* may begin listening to the personalized channel by selecting the exit-and-listen button.

If user 101 *a . . . n* selects the customize-more button, then system 208 transmits user interface screen 320 (see FIG. 3B) to the client, which displays screen 320 to user 101 *a . . . n*. Screen 320 enables user 101 *a . . . n* to set the music mix for the channel. For example, if user 101 *a . . . n* selected the following three genres: Smooth R&B, Classic R&B, and R&B/Hip Hop, then screen 320 enables user 101 *a . . . n* to assign a percentage to each of these genres, where the percentage determines the music mix for the channel. For instance, if Smooth R&B is set to 35%, then about 35% of the songs that are played on the personalized channel will be Smooth R&B songs. At this point, user 101 *a . . . n* may customize the channel further by selecting the customize-more button or user 101 *a . . . n* may begin listening to the personalized channel by selecting the exit-and-listen button.

In one embodiment if user 101 *a . . . n* selects the customize-more button, then system 208 transmits user interface screen 330 (see FIG. 3C) to the client, which displays screen 330 to user 101 *a . . . n*. For each genre selected by the user 101 *a . . . n*, screen 330 displays a list of music styles. For example, the following styles are listed under the Smooth R&B category: Grooves, Love Songs, Male Artists, Neo-Classical Soul, and Songstress'. From this screen, user 101 *a . . . n* may rate each style of music. The styles rating will determine how often songs from that style will be played on the personalized audio channel. As shown, in FIG. 3C, user 101 *a . . . n* may rate a style as a "+" a "−" or a "0". If user 101 *a . . . n* rates a style as a "0", then no songs from that style will played on the personalized audio channel. If user 101 *a . . . n* rates as a "+", then more songs from that style will played on the personalized audio channel. If user 101 *a* . . . *n* rates as a "–", then less songs from that style will played on the personalized audio channel. At this point, user 101 *a* . . . *n* may customize the channel further by selecting the customize-more button or user 101 *a* . . . *n* may begin listening to the personalized channel by selecting the exit-and-listen button.

In one embodiment if user 101 *a* . . . *n* selects the customize-more button, then system 208 transmits user interface screen 340 (see FIG. 3D) to the client, which displays screen 340 to user 101 *a* . . . *n*. For each genre selected by the user 101 *a* . . . *n*, screen 340 displays a list of artists that are associated with that genre. For example, the following artists are listed under the Smooth R&B category: Regina Belle, Eric Benet, Boyz II Men, etc. . . . . From this screen, user 101 *a* . . . *n* may rate each listed artist. The artist's rating will determine how often songs from that artist will be played on the personalized audio channel. As shown, in FIG. 3D, user 101 *a* . . . *n* may rate an artist as a "+" a "–" or a "0". If user 101 *a* . . . *n* rates an artist as a "0", then no songs from that artist will played on the personalized audio channel. If user 101 *a* . . . *n* rates an artist a "+", then more songs from that artist will played on the personalized audio channel. If user 101 *a* . . . *n* rates an artist a "–", then less songs from that artist will played on the personalized audio channel. At this point, user 101 *a* . . . *n* may rate more artists by selecting the rate-more-artists button or user 101 *a* . . . *n* may begin listening to the personalized channel by selecting the exit-and-listen button.

The information requested by screens 300, 320, 330, and 340 is used to illustrate one set of user preference information. Other information in addition to or instead of the information requested could be collected from user 101 *a* . . . *n* to create a personalized audio channel.

After user 101 *a* . . . *n* selects the exit-and-listen button, the audio channel profile information specified by user 101 *a* . . . *n* is stored in a channel profile 212 in storage system 210 and is associated with the user and/or with the user's subscriber device 110 *a* . . . *n*. Channel profile 212 may be, for example, a text file or a record in a database. Optionally, system 206 may signal playlist generator 204 that a new profile 212 has been created. In response, playlist generator 204 may generate a list of works (hereafter referred to as a "playlist"), which is then associated with the newly created channel profile and stored in storage system 210. Additionally, the playlist "matches" the profile of the audio channel. That is, if the audio channel is specified by the user as follows: 30% Rock genre and 70% Alternative genre, then the set of works identified in the playlist should closely conform to this specification.

Playlist generator 204 creates the playlist based, at least in part, on the channel profile information specified by user 101 *a* . . . *n* that is stored in the profile. For example, if user 101 *a* . . . *n* selected the Jazz genre, then the playlist will include audio-work identifiers (e.g., song titles or music video titles) that identify Jazz audio-works. Additionally, if user 101 *a* . . . *n* rated a particular jazz song and jazz artist as a "0," then playlist generator 204 will be sure not to add to the playlist that particular jazz song or any song from the particular artist. The contents of audio-works collection 214 may also be taken into account in creating the playlist. For example, in one embodiment, the playlist contains only audio-work identifiers that identify an audio-work that is included in audio-works collection 214.

Once user 101 *a* . . . *n* creates a personalized audio channel, user 101 *a* . . . *n* can begin listening to it. In one embodiment, to listen to a personalized audio channel, user 101 *a* . . . *n* uses his/her subscriber device 110 *a* . . . *n* to send a channel-select request to media server 202. The channel-select request preferably includes a user-identifier that uniquely identifies user 101 *a* . . . *n* or subscriber device 110 *a* . . . *n*.

Figure 4:
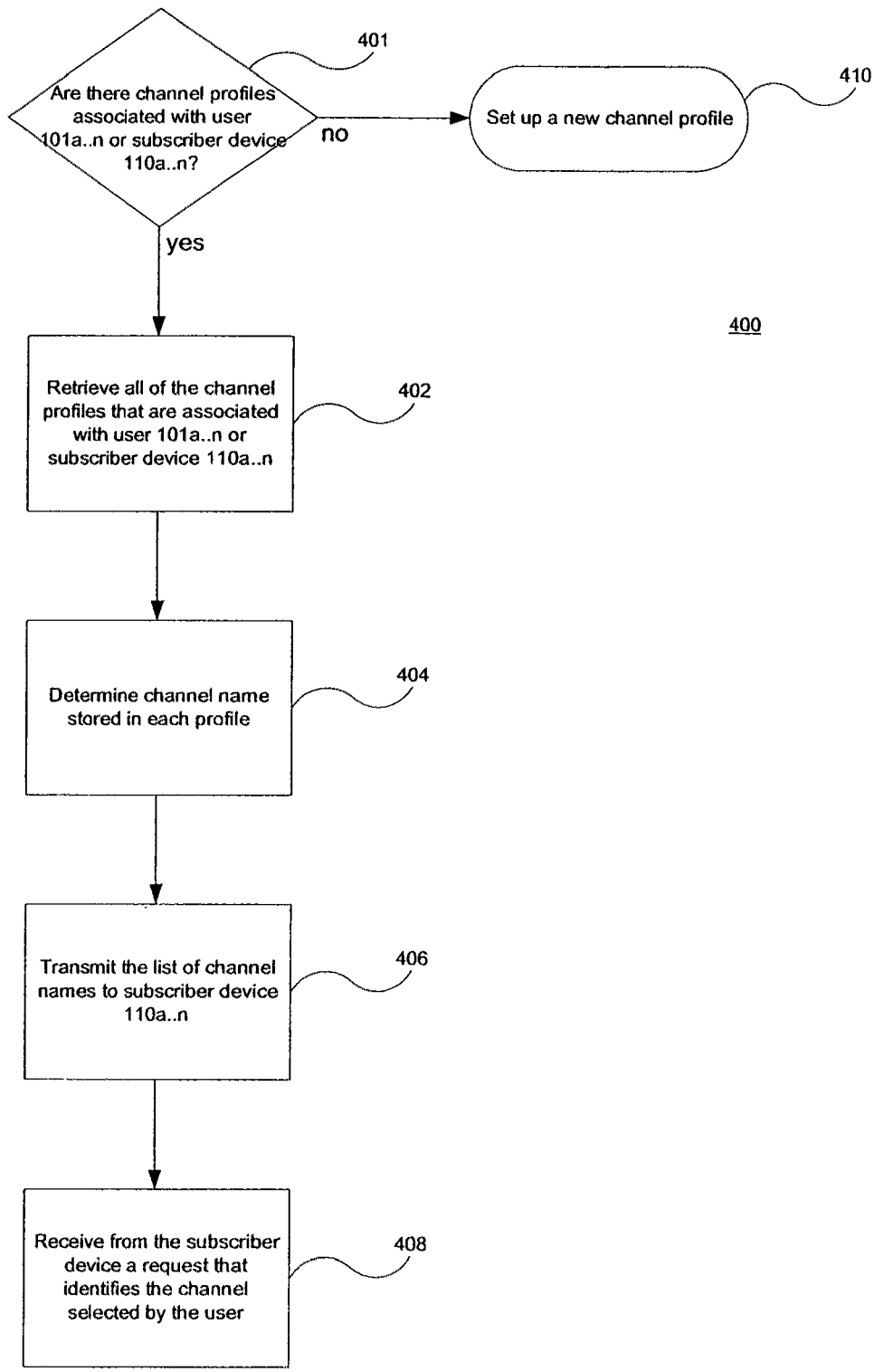
FIG. 4 is a flowchart illustrating a process, according to one embodiment, that is performed by the media server after receiving a channel-select request sent from the subscriber device.

FIG. 4 is a flowchart illustrating a process 400, according to one embodiment, that is performed by media server 202 after receiving the channel-select request sent from the subscriber device 110 *a* . . . *n*. After receiving the request, media server 202 first checks (step 401) if there are any channel profiles associated with the user 101 *a* . . . *n* or subscriber device 110 *a* . . . *n* making the request. If there are no channel profiles associated with the user, control passes to step 410 and then proceeds to display the user interface screen 300 shown in FIG. 3A. Flow continues from user interface screen 300 as described above which will be further described below. If there are channel profiles associated with the subscriber device 110 *a* . . . *n* or user 101 *a* . . . *n*, media server 202 retrieves all of the channel profiles, if any, that are associated with user 101 *a* . . . *n* or subscriber device 110 *a* . . . *n* (step 402), determines the channel name stored in each profile (step 404), and transmits the list of channel names, if any, to subscriber device 110 *a* . . . *n* (step 406), which then displays the channel names as shown for example in FIG. 6D using audio/video system 111 *a* . . . *n*. At this point, user 101 *a* . . . *n* selects one of the listed personalized channels, and then causes subscriber device 110 *a* . . . *n* to send a listen-request to media server 202. The listen-request includes an identifier that identifies the personalized channel selected by user 101 *a* . . . *n*. In step 408, media server 202 receives the listen-request. Alternatively, user 101 *a* . . . *n* can send a listen-request to media server using a network other than network 108. For example, if network 108 is a one-way cable-TV network, user 101 *a* . . . *n* may cause a listen request to be sent to media server 202 by placing a telephone call and selecting a particular personalized audio channel.

In another embodiment, if the user selected a desire to listen to the standard broadcast audio service via a user interface screen (FIG. 6D), the user would then be directed to the last broadcast channel they consumed, and the personalized music session would be terminated until called up again in the future.

Figure 5A:
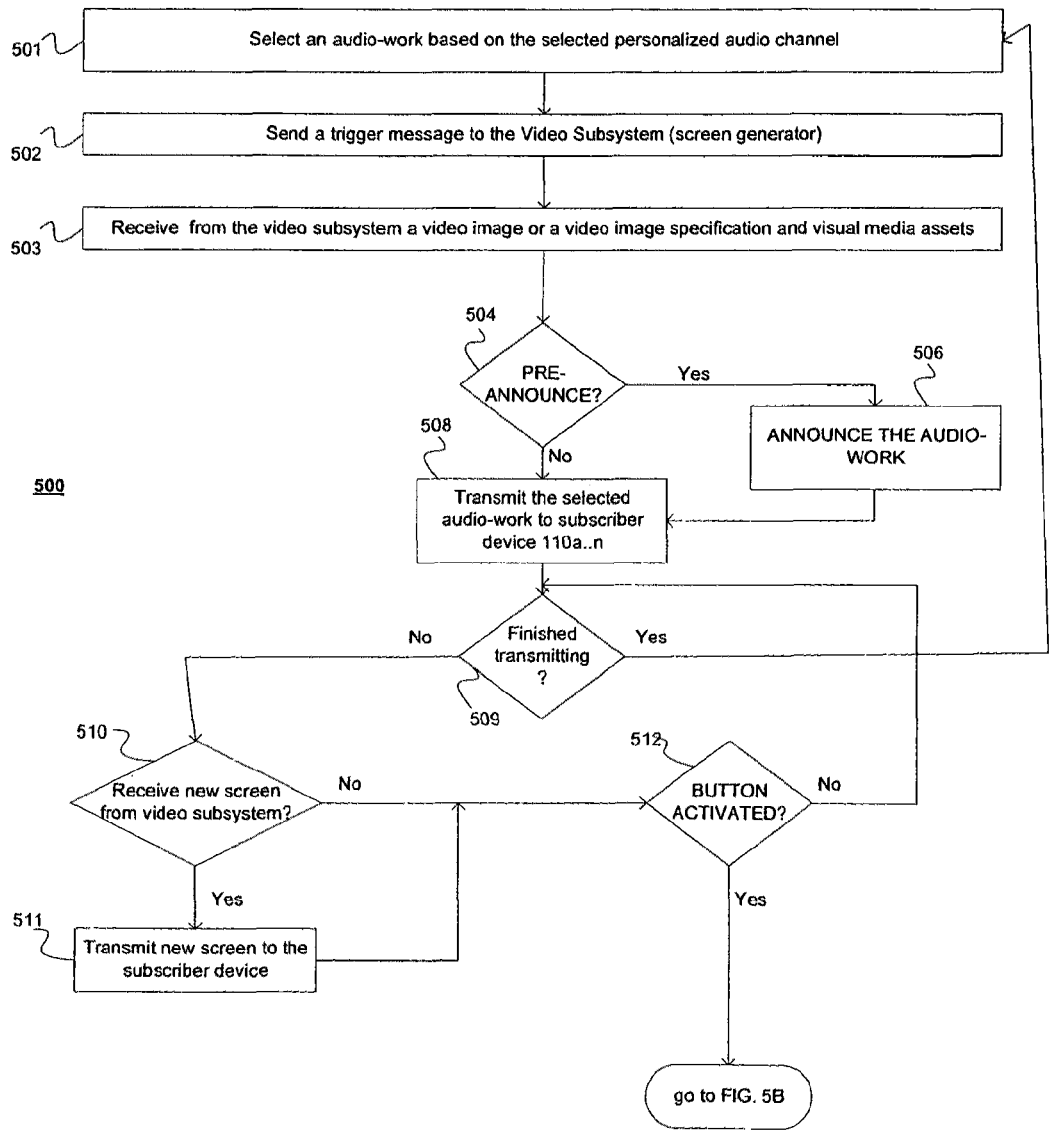
FIGS. 5A and 5B illustrate a process, according to one embodiment, that is performed by the media server in response to the media server receiving a listen-request from a subscriber device.
Figure 5B:
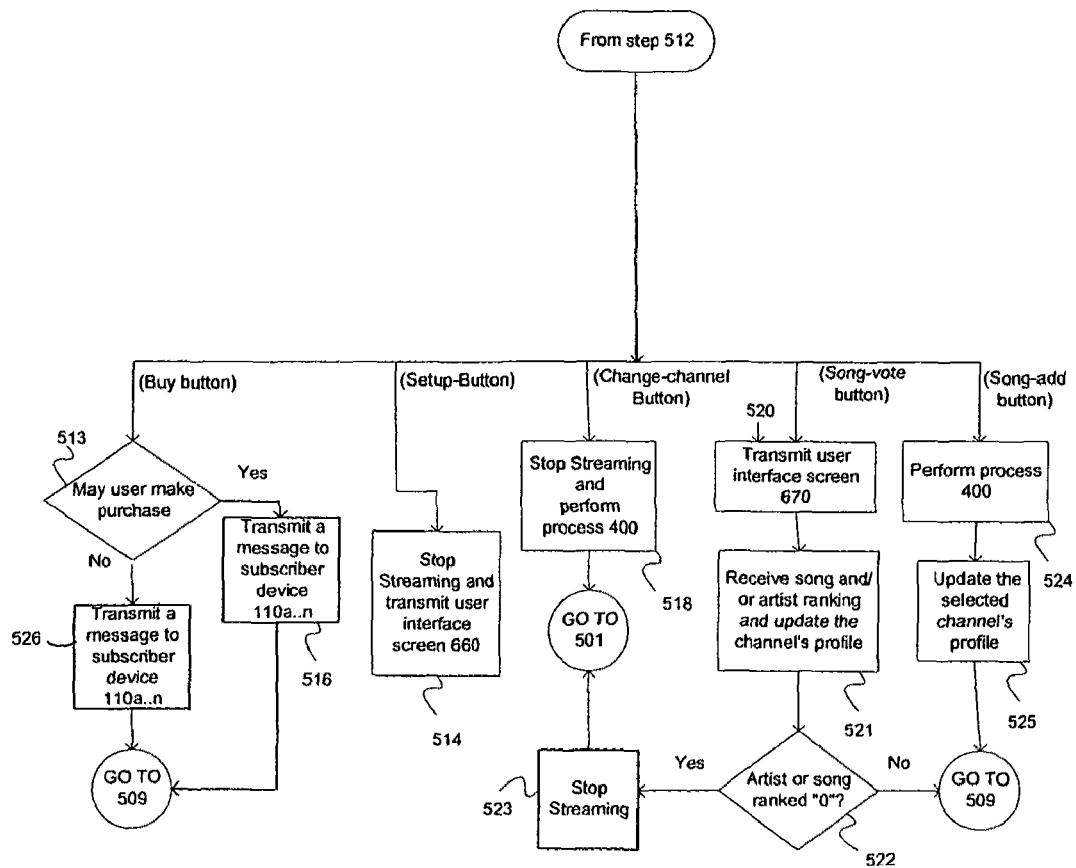

FIGS. 5A-5B is a flow chart illustrating an embodiment process 500 performed by media server 202 in response to receiving the listen-request. Process 500 begins in step 501, where media server 202 selects an audio-work based on the channel selected by user 101 *a* . . . *n*. In one embodiment, in addition to the selection of the audio-work being based on the channel selected by user 101 *a* . . . *n*, the selection is also based on one or more provisions of a statute (e.g., the Digital Millennium Copyright Act (DMCA)), regulation, or contract. More specifically, in one embodiment, media server 202 may select and play audio-works for user 101 *a* . . . *n* in such a manner that the use of the media-on-demand system 202 by user 101 *a* . . . *n* falls within a statutory compulsory license provision(s). If the selected audio-work is in collection 214, then the selected audio-work is retrieved from storage system 210. Otherwise, the selected audio-work may optionally be transmitted from a remote server (not shown) to media server 202.

In step 502, media server 202 sends a trigger message to video subsystem 208. The message includes an identifier that identifies the audio-work selected in step 501. After receiving the message, video subsystem 208 generates a user interface screen that will be displayed to user 101 *a* . . . *n*. More specifically, in one embodiment, video subsystem 208 generates a video image specification, which specifies one or more visual media asset identifiers, each of which identifies one or more visual media assets. In another embodiment, video subsystem 208 generates a video image. Video subsystem 208 then transmits to media server 202 the generated user interface screen. That is, video subsystem 208 transmits the video image or the video image specification and the visual media assets identified therein. The visual media assets may be obtained from visual media asset collection 216. The generated user interface screen is based, at least in part, on the audio-work identified in the trigger message. The user interface screen defines how user 101 a . . . n's output device screen will look when the audio-work is transmitted to user 101 a . . . n's subscriber device. Further details concerning the operation of video subsystem 208 and how it generates a user interface screen are described in U.S. patent application Ser. No. 10/066,793.

Figure 6A:
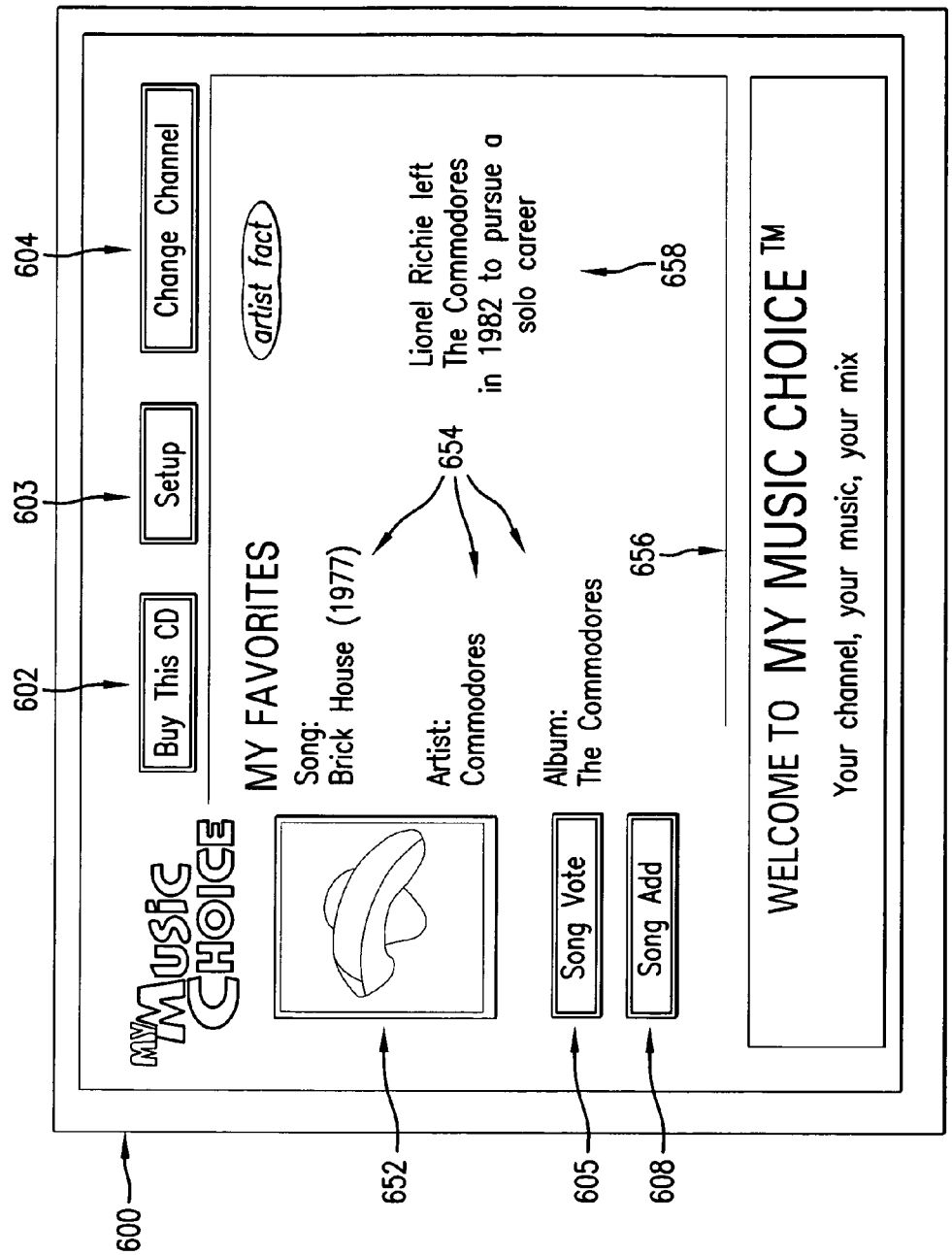
FIGS. 6A-6D illustrate example user interface screens that are generated by the video subsystem.
Figure 6B:
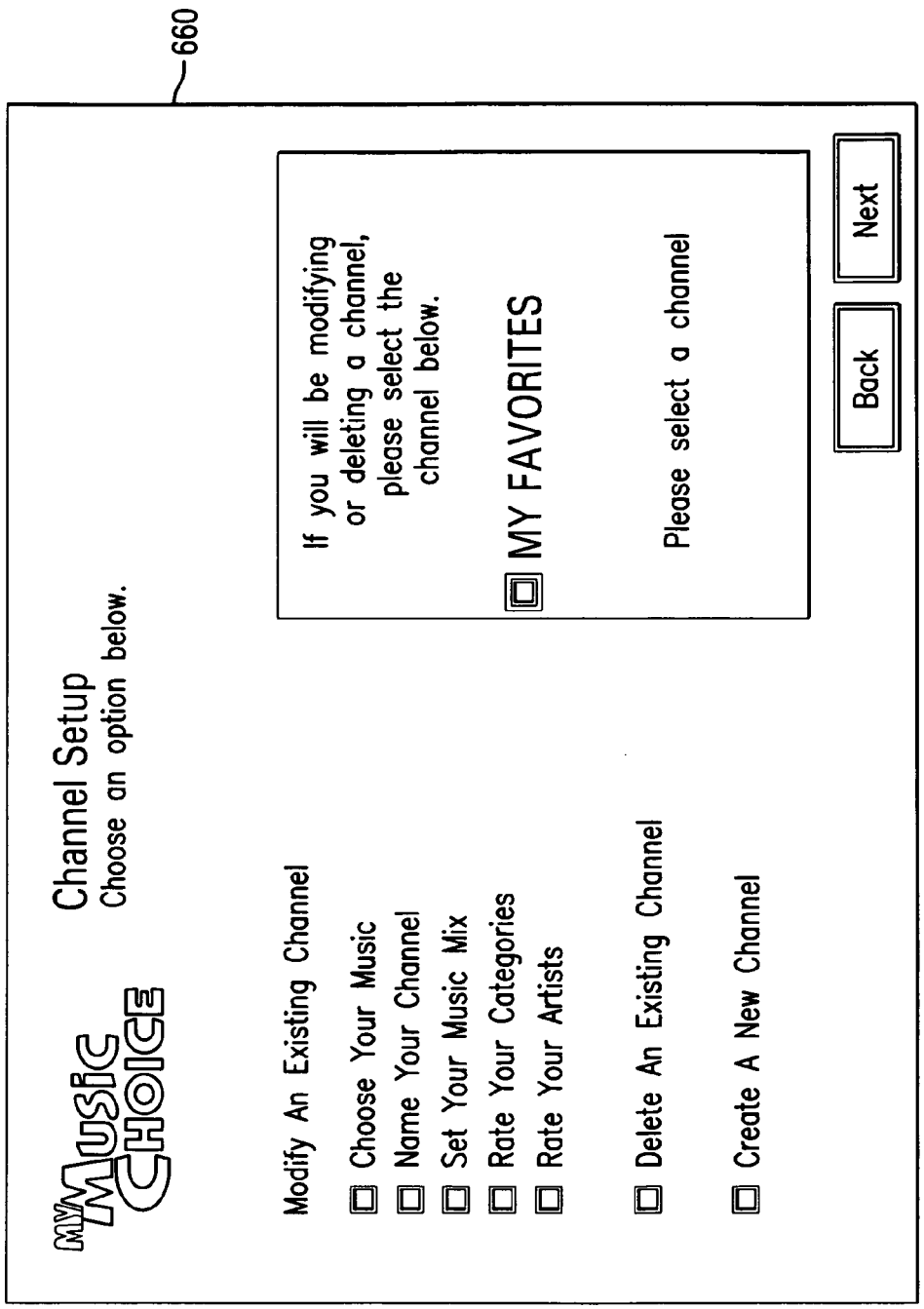
Figure 6C:
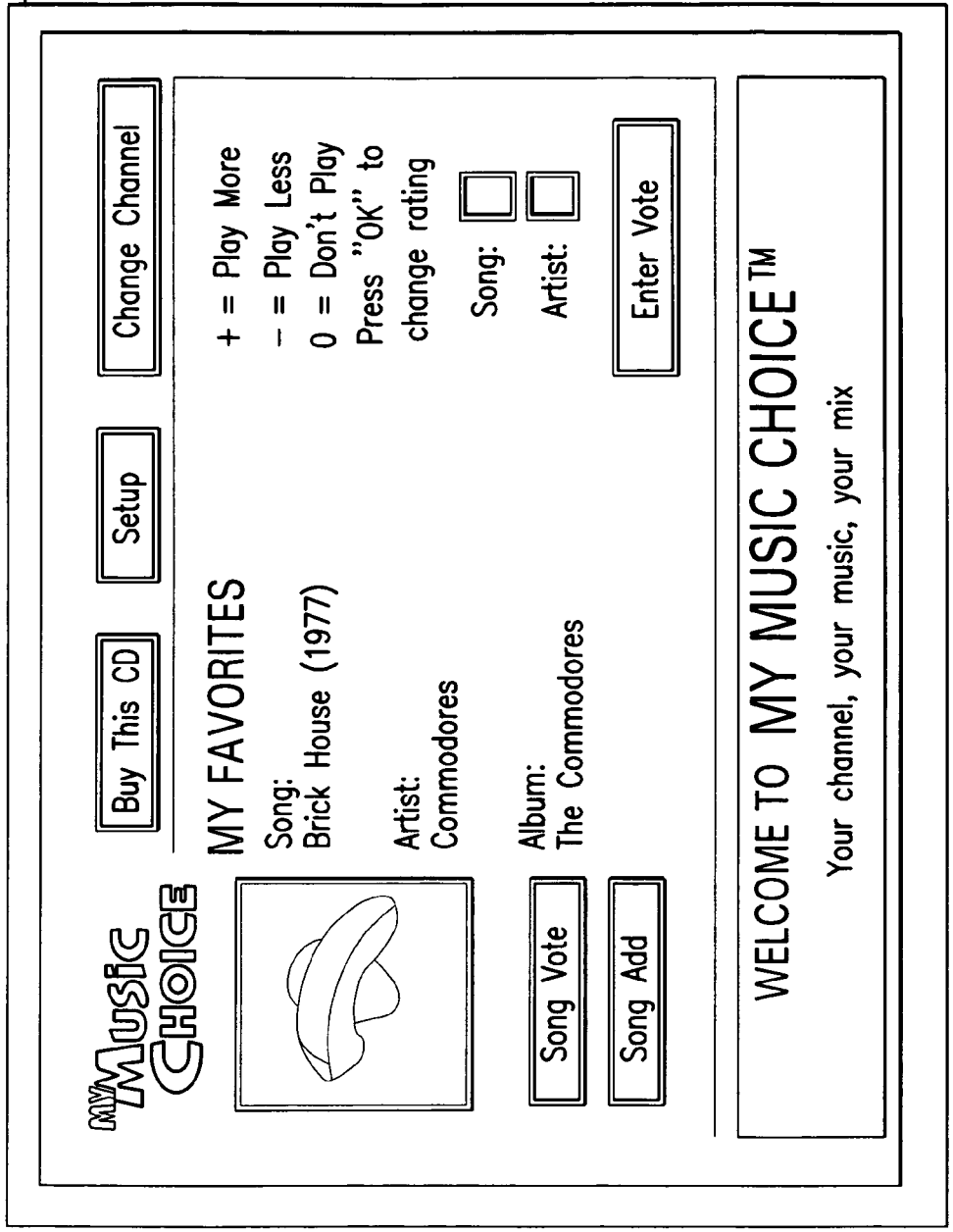
Figure 6D:
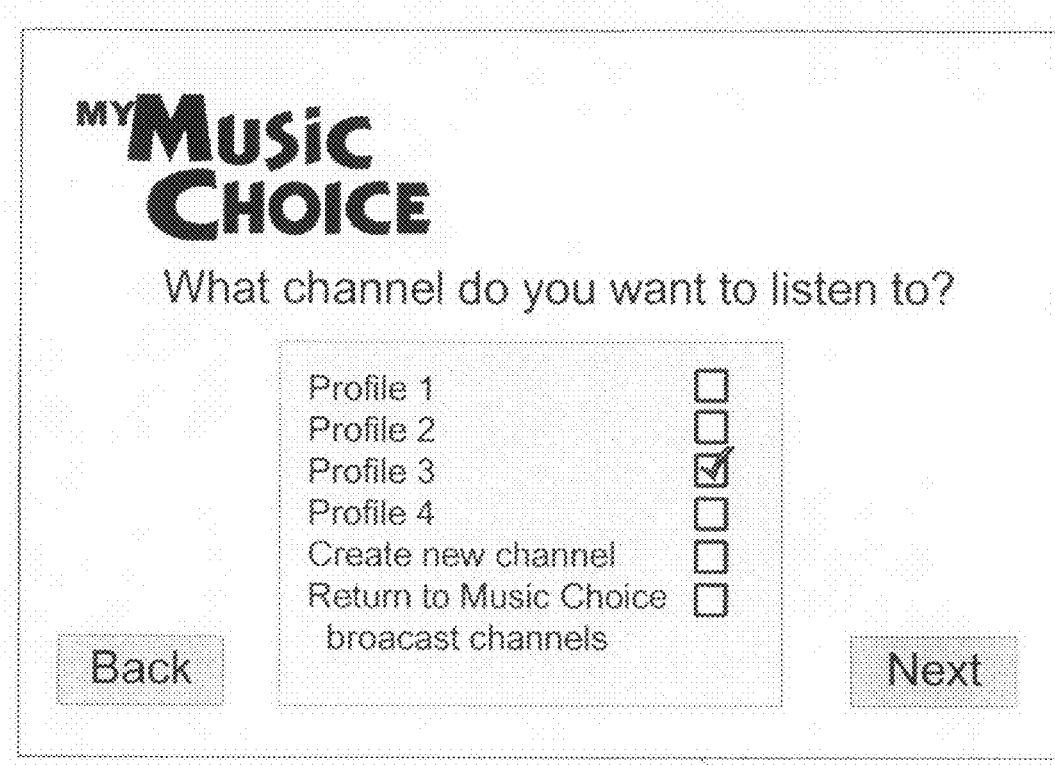

FIG. 6A illustrates an example user interface screen 600 that is generated by video subsystem 208. Example user interface screen 600 includes: text 654 that identifies the artist who recorded the audio-work, the title of the audio-work, and the name of an album that includes the audio-work. This information may be stored in database 218. User interface screen 600 may further include: album art work 652 that is associated with the selected audio-work, music news and/or trivia 658, advertising banners 656, and the following selectable buttons: buy-button 602, setup-button 603, change-channel button 604, song-vote button 605, and song-add button 606. These visual media assets may be stored in collection 216.

Referring back to FIG. 5A, in step 503, media server 202 receives from video subsystem the user interface screen (i.e., a video image or a video image specification and the visual media assets identified therein). In step 504, media server 202 determines whether it can pre-announce the audio-work. Pre-announce means to audibly and/or visually inform user 101 a . . . n of the title and artist of the selected audio-work prior to transmitting the audio-work to user 101 a . . . n's subscriber device. If it can pre-announce the audio-work, control passes to step 506, wherein the audio-work is pre-announced; otherwise control passes to step 508. Preferably, if the selected audio-work is a song or other type of music, media server 202 cannot pre-announce the audio-work, unless so doing does not "violate" a law (statute or regulation) or contract.

In step 508, media server 202 streams to subscriber device 110 a . . . n using network 108 the selected audio-work and user interface screen received from video subsystem 208. Upon receiving the stream, subscriber device 110 a . . . n may decode the contents of the stream and then stream the decoded data to audio/video system 111 a . . . n so that user 101 a . . . n can listen to the audio-work being streamed from media server 202. Similarly, upon receiving a video image, subscriber device 110 a . . . n streams the video image to audio/video system 111 a . . . n so that user 101 a . . . n can view the video image. And, upon receiving a video image specification and corresponding visual media assets, subscriber device 110 a . . . n generates the video image specified by the video image specification and streams the video image to audio/video system 111 a . . . n so that user 101 a . . . n can view the video image. At this point, user 101 a . . . n may select one or more of the displayed selectable buttons (see FIG. 6A).

In one embodiment while the audio-work is being streamed to subscriber device 110 a . . . n, media server 202 performs steps 509-525. In step 509, media server 202 determines whether the audio-work selected in step 501 is finished being streamed to the subscriber device. If it is, control passes back to step 501, otherwise control passes to step 510.

In step 510, media server 202 determines whether it has received a new screen (e.g., video image or video image specification with corresponding visual media assets) from video subsystem 208. If it has, control passes to step 511; otherwise control passes to step 512. In step 511, media server 202 transmits the new screen to subscriber device 110 a . . . n. Video subsystem 208 may create one or more a new screens so that, for example, the advertising banners 656 and/or news and trivia 658 change while the selected audio-work is being transmitted to subscriber device 110 a . . . n. After step 511, control passes to step 512.

In step 512, media server 202 determines whether user 101 a . . . n has selected one of the buttons 602-606. If no button is activated, control passes back to step 509, otherwise control passes to step 513, 514, 518, 520, or 524. Control passes to step 513 if buy-button 602 was activated. Control passes to step 514 if setup-button 603 was activated. Control passes to step 518 if change-channel button 604 was activated. Control passes to step 520 if song-vote button 605 was activated. And control passes to step 524 if song-add button 606 was activated.

In step 513, media server 202 communicates with a remote server (not shown) to verify that user 101 a . . . n is qualified to purchase or download the requested audio-work (e.g., does user 101 a . . . n have enough money is his or her account). It should be understood that the requested audio work may include a single cut, an album or a collection to be delivered on a selected media such as CD, tape or electronic media. If media server 202 determines that user 101 a . . . n may purchase the audio-work, control passes to step 516, otherwise control passes to step 526. In one embodiment, in step 516, media server 202 transmits a message to the subscriber device that causes the subscriber device to store a copy of the requested audio-work on a non-volatile storage medium to which user 101 a . . . n has access so that user 101 a . . . n may access the audio-work whenever user 101 a . . . n so desires. In another embodiment, in step 516, media server 202 may transmit a message to fulfillment center (not shown), which fulfills the user's request. The fulfillment center has the capability to fulfill the order by shipping the requests on a variety of media such as CD, tape, other tangible media. After step 516, control passes back to step 509. In step 526, media server 202 transmits a message to the subscriber device 110 a . . . n informing the user 101 a . . . n of an invalid purchase qualification. Control then passes to step 509.

In step 514, if necessary, media server 202 stops transmitting the audio-work to subscriber device 110 a . . . n and transmits user interface screen 660 (see FIG. 6B) to subscriber device 110 a . . . n. Alternatively, audio-work transmission may be continuous while the media server 202 transmits user interface screen 660. From screen 660 user 101 a . . . n may modify an existing channel's profile, delete an existing channel, or create a new channel.

In step 518, media server 202 stops streaming the audio-work to subscriber device 110 a . . . n and then performs process 400. After completing process 400, control passes back to step 501 where an audio-work is selected based on the selected personalized audio channel. Alternatively, audio-work transmission may be continuous while the media server 202 performs process 400.

In step 520, media server 202 transmits user interface screen 670 (see FIG. 6C) to subscriber device 110 a . . . n. From screen 670 user 101 a . . . n may rate the song and/or the artist as a "+", "−", or "0". In step 521, media server 202 receives the song and/or artist rating and updates the channel's profile to reflect the song and artist rating received from user 101 a . . . n. This will be used for future playlist generation. In an embodiment, next (step 522), media server 202 determines whether the user rated the song or the artist as a "0." If the song or artist were rated a "0", streaming will optionally stop and control passes to step 501. Otherwise, control passes to step 509.

In step 524, media server performs process 400. After completing process 400, media server 202 updates the selected channel's profile by adding the song to a favorite song list within the profile (step 525). After step 525, control passes back to step 509.

Preferably, in performing step 501, the audio-works may be selected "intelligently." For example, the audio-works are selected such that the resulting set of selected audio-works "matches" the profile of the selected audio channel. That is, if the audio channel is specified as follows: 30% Rock genre (20% Hard Rock and 10% Light Rock) and 70% Alternative genre, then the resulting set of selected audio-works should closely conform to this specification.

Additionally, the audio-works can be selected to not only match the profile of the audio channel, but also to conform to any statutory, regulatory or contractual requirement that governs the transmission of audio-works. For example, if there is a compulsory license requirement that all songs not owned by the listener are not allowed to be played more than once within a certain time interval (e.g., you can't play a song more than once within any given hour), then playlist generator 204 will be configured so as not to violate this requirement when it selects audio-works in step 501. In short, this will ensure that the playlist will fall within the compulsory license provision.

As an additional feature, user 101 $a \ldots n$ may have no direct control over which songs are selected in step 501. All that user 101 $a \ldots n$ might directly control is an audio channel's profile, which merely gives user 101 $a \ldots n$ indirect control over which songs are selected in step 501. That is, by having indirect control over an audio channel's profile, user 101 $a \ldots n$ may influence which songs are selected in step 501, but can not directly control which songs will get selected. Further, user 101 $a \ldots n$ has no way to determine which songs will get selected. With these features, listening to an audio channel may be just like listening to a conventional radio station in terms of not knowing which audio-work is going to be selected next.

In one embodiment, after receiving the listen-request but prior to performing step 501, media server 202 requests playlist generator 204 to generate a playlist for the selected personalized audio channel if one does not already exist or if one exists but it is out-of-date (i.e., more than X days old, where X is a configurable parameter). Playlist generator 204 then retrieves the profile associated with the selected channel and uses the profile to create a playlist that matches the profile. Preferably, the playlist also meets the requirements of a statutory compulsory license. The playlist is stored in storage system 210 and is associated with the selected personalized audio channel. In performing step 501, media server 202 accesses the playlist and selects from the playlist the audio-works to be streamed.

Figure 7:
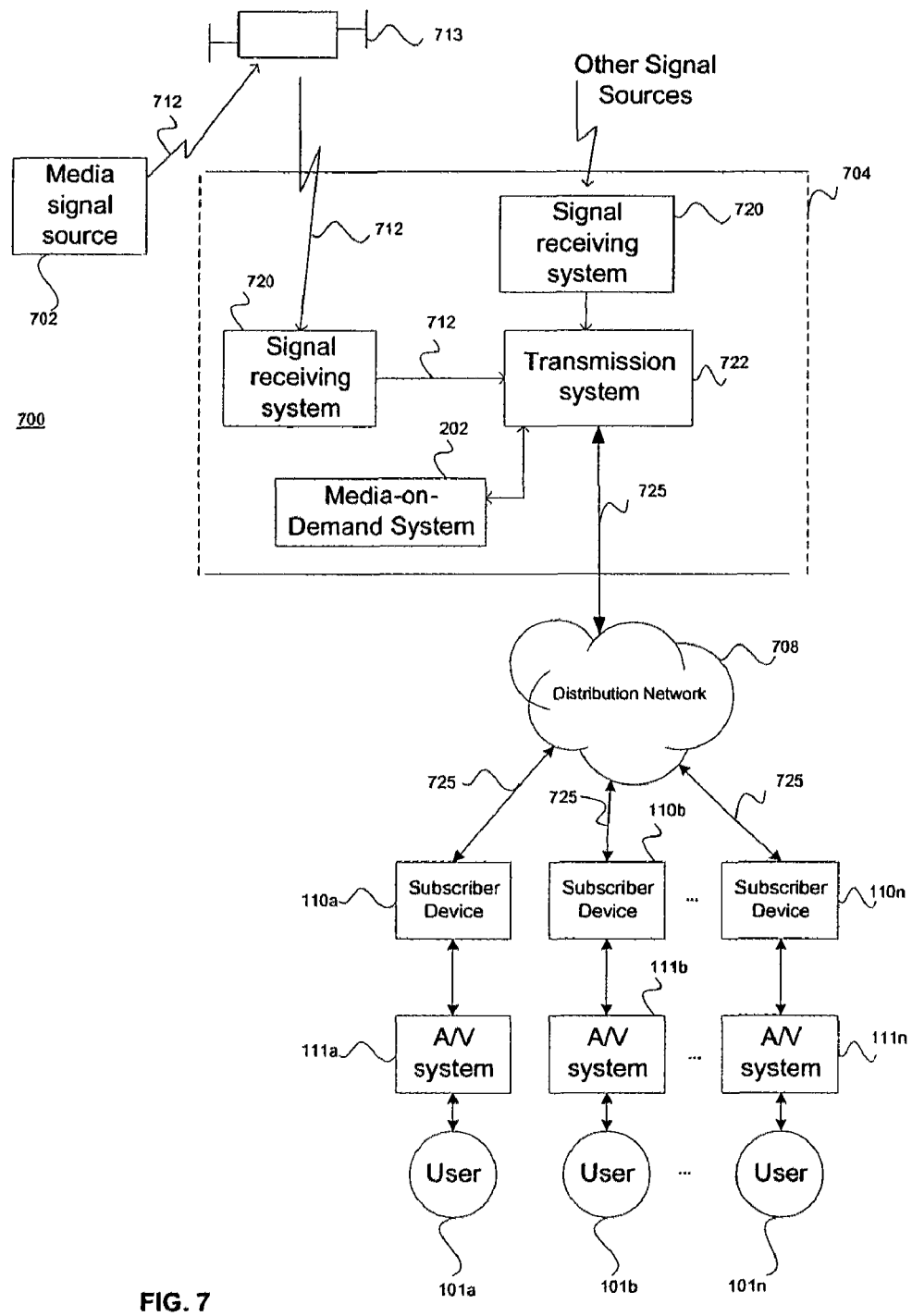
FIG. 7 is a block diagram of a system 700, according to one embodiment, for providing both a personalized media service and a broadcast media service.

FIG. 7 is a block diagram of a system 700 for providing both a personalized media service and a broadcast service to users 101 $a \ldots n$. System 700 includes one or more broadcast media sources 702, one or more signal distribution centers 704, one or more distribution networks 708, media-on-demand system 102, and a plurality of subscriber devices 110 $a \ldots n$.

Broadcast media source 702, hereinafter referred to simply as media source 702 may broadcast a signal 712 to one or more distribution centers 704. Signal 712 may contain various content such as music, video, or other media or multimedia works. As shown in FIG. 7, media source 702 may use a communications satellite 713 to transmit signal 712 to distribution center 704, but other communication methods may also be used. Signal 712 contains one or more broadcast media channels, with each channel being associated with one or more genres or category of media. For example if signal 712 contains music, one of the broadcast channels may be associated with the Jazz genre while another may be associated with the Alternative Rock genre. As used herein, a channel is any data stream that includes a content component, such as, for example, an audio/video stream.

Distribution center 704 may be, for example, a cable head-end, and may include one or more broadcast signal receiving systems 720 for receiving signals transmitted from signal sources and a transmission system 722 for multiplexing the received signals and the streams outputted by media-on-demand system 102 to generate a multiplexed signal 725 and for transmitting the multiplexed signal 725 to subscriber devices 110 $a \ldots n$ via a distribution network 708.

Subscriber devices 110 $a \ldots n$ are operable to isolate at least one of the streams within multiplexed signal 725 and then provide the isolated stream to an audio/video system 111 $a \ldots n$, which reproduces the media signal contained in the stream for a user to hear and/or view. In this way, both a broadcast media service and a personalized media service can be conveniently provided to user 101 $a \ldots n$.

Distribution network 708 may include, for example, various amplifiers, bridges, routers, taps, drop cables, and/or other communications equipment. Additionally, distribution network 708 may be a wireless network. The subscriber devices 110 $a \ldots n$ may be, for example, a conventional unidirectional or bi-directional set-top box or a computer equipped with, at the least, an interface for receiving signals sent through distribution network 708.

Although FIG. 7 shows that all of the components of media-on-demand system 102 are included within distribution center 704, this need not be the case as some or all of the components of media-on-demand system 102 may be located remotely from distribution center 704.

Figure 14:
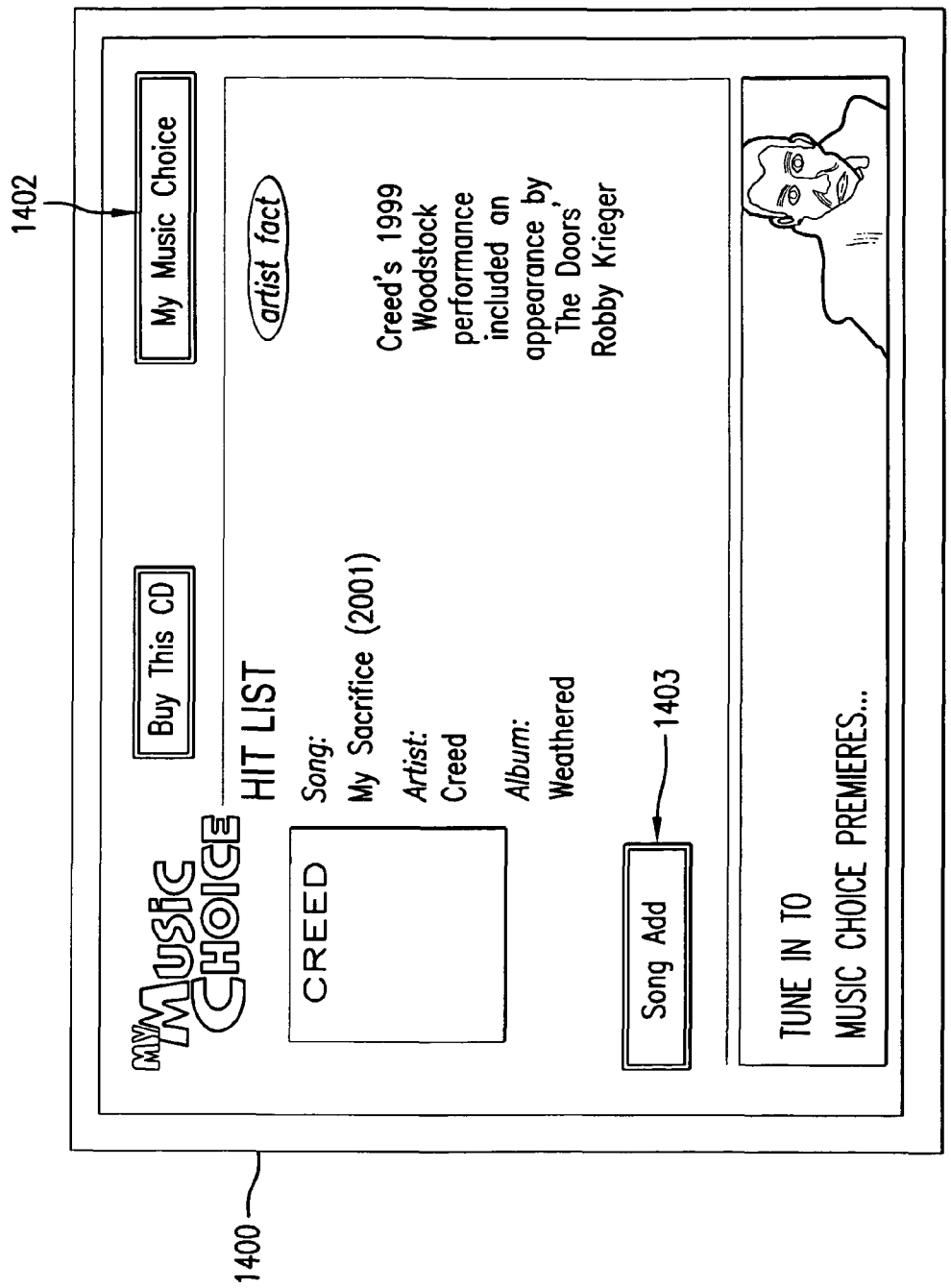
FIG. 14 illustrates an example user interface that is associated with a channel transmitted by the broadcast media source.

In one embodiment, the channels that are transmitted by media source 702 have an associated user interface that is displayed to the user 101 $a \ldots n$ when the user configures his/her subscriber device 110 $a \ldots n$ to isolate the channel from multiplexed signal 725. FIG. 14 illustrates an example user interface 1400 that is associated with an channel transmitted by broadcast media source 702. In this exemplary user interface 1400, an audio channel is transmitted. It should be understood that a similar user interface can be easily adapted to other media/content within the scope of this embodiment and the invention as was described above. Exemplary user interface 1400 includes a My-Music button 1402 that user 101 $a \ldots n$ may activate when user 101 $a \ldots n$ desires to listen to or modify one of his/her personalized channels or to create a new personalized channel. Activating button 1402 causes subscriber device 110 $a \ldots n$ to transmit the channel-select request to media-on-demand system 102. As described above, media-on-demand system 102 performs process 400 in response to receiving the channel-select request.

Figure 8:
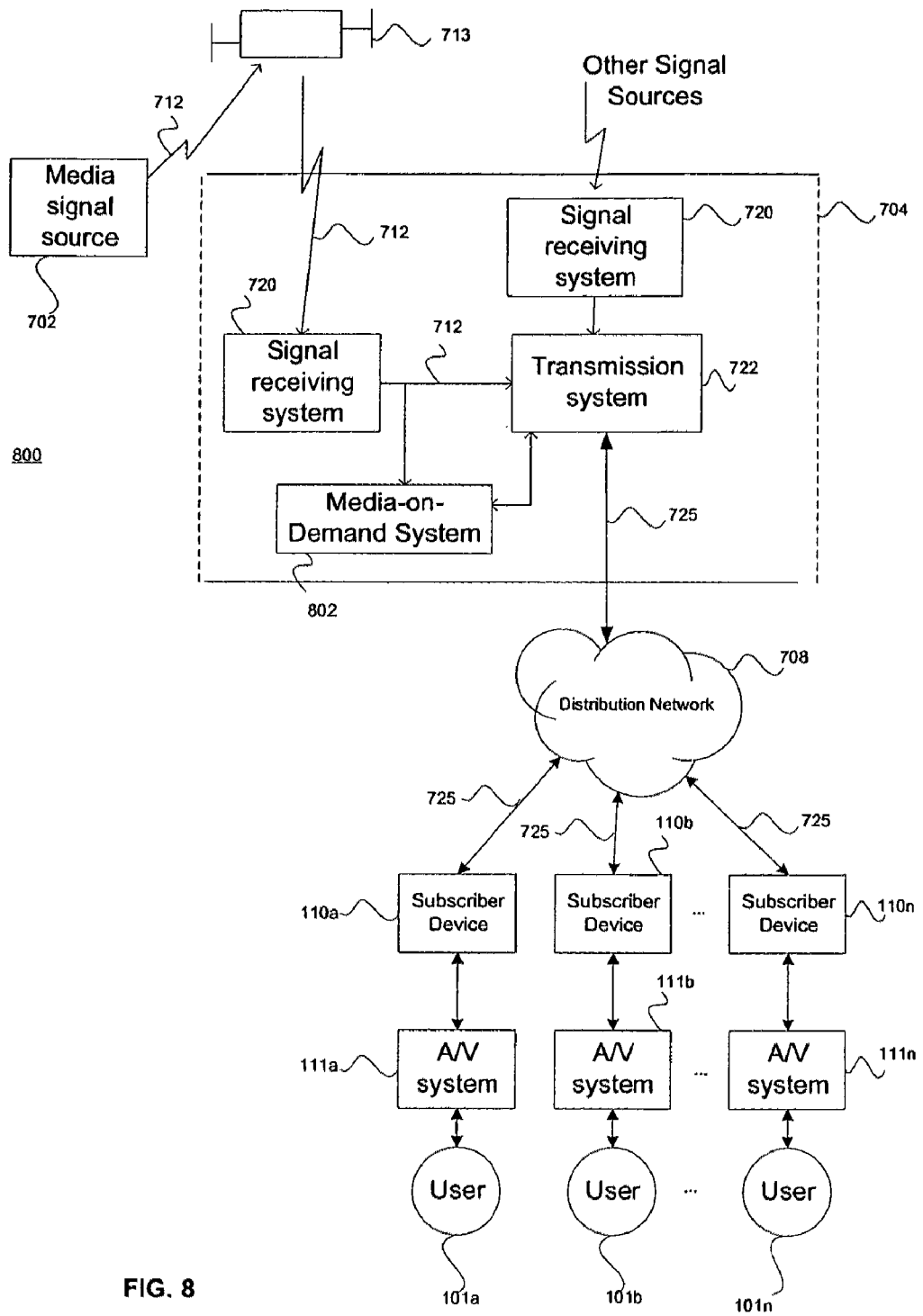
FIG. 8 is a block diagram of a system, according to another embodiment, for providing a personalized media service to users.

FIG. 8 is a block diagram of a system 800, according to another embodiment, for providing a personalized media service to users 101 $a \ldots n$. In this embodiment, media-on-demand system 802 is configured to receive the channels transmitted by media source 702 and enables users 101 $a \ldots n$ to not only create and listen to their own personalized channels as described above, but also to filter the channels transmitted by media source 702.

Figure 9:
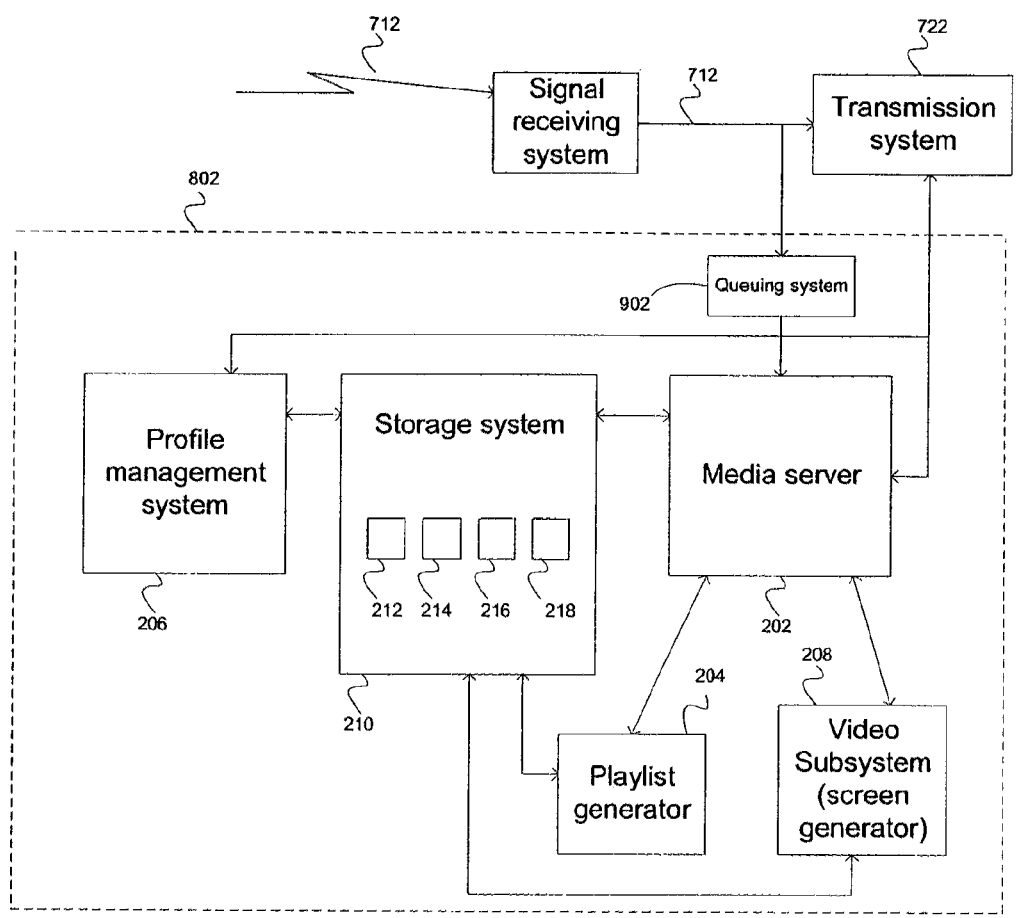
FIG. 9 illustrates an embodiment of a media-on-demand system.

FIG. 9 further illustrates an embodiment of media-on-demand system 802. Media-on-demand system 802 includes all the components of media-on-demand system 102 and further includes a queuing system 902. Queuing system 902 receives signal 712 and is in communication with media server 202. Queuing system 902 includes a buffer for each channel included in signal 712. The buffer is used to implement a queue of the works that are transmitted on the channel associated with the buffer. That is, each channel transmitted by media source 702 has an associated queue within system 902. The queue receives and stores the works transmitted over the channel associated with the queue. In one embodiment, each queue has a finite size and, thus, buffers only the work currently being transmitted (or only a portion thereof) and the last N previous works, where N may be greater than or equal to zero (0). In one embodiment, the queues are first-in first-out (FIFO) queues. Although queuing system 902 is shown in FIG. 9 as being separate from media server 202, this is not a requirement as media server 202 may include the buffers necessary to implement queuing system 902.

As mentioned above, users 101 $a \ldots n$ can filter one or more of the channels transmitted by media source 702. A user (e.g., user 101 $a \ldots n$), filters one of the channels transmitted by media source 702 by selecting one of the channels and creating a profile for that channel. In one embodiment, user 101 $a \ldots n$ creates the profile by using a client software application to connect to channel-profile-management system 206.

After the client establishes a connection with system 206, user 101 $a \ldots n$ can send a message to system 206 indicating that user 101 $a \ldots n$ desires to create a profile for one or more of the channels transmitted by media source 702. In response to receiving this message, system 206 transmits a list of the channels provided by media source 702 that user 101 $a \ldots n$ may filter. User 101 $a \ldots n$ selects a channel from the list and causes the client to send a message to system 206 that indicates the channel selected by the user 101 $a \ldots n$. In one embodiment, in response to receiving the channel selection message, system 206 transmits an exemplary blank profile form 1000 (see FIG. 10) to the client, which displays exemplary form 1000 to user 101 $a \ldots n$. Once again, it should be understood that the form 1000 is an exemplary form which may be associated with an audio channel. The exemplary form 1000 can be easily adapted for channels and/or systems transmitting other media within the scope of this invention as described above. Exemplary form 1000 is a fill-in form that enables user 101 $a \ldots n$ to input his/her audio preference information. The information requested by exemplary form 1000 is used to illustrate one set of preference information. Other information in addition to or instead of the information requested by exemplary form 1000 could be collected from a user.

Referring to FIG. 10, exemplary form 1000 asks user 101 $a \ldots n$ to select the styles of music, if any, that user 101 $a \ldots n$ does not want to listen to (i.e., the styles that user 101 $a \ldots n$ wants to filter). The style choices that are presented to user 101 $a \ldots n$ depend on the channel that user 101 $a \ldots n$ selected. In this example, user 101 $a \ldots n$ selected the Classic Rock channel, thus, the styles that user 101 $a \ldots n$ is asked to select are styles of Classic Rock music. Exemplary form 1000 also asks user 101 $a \ldots n$ to list his/her least favorite songs and least favorite artists (i.e., the songs and the artists that user desires to filter), as well as to list her/her favorite songs and favorite artists. When user 101 $a \ldots n$ selects done button 1090, system 206 creates a new profile in storage system 210 and stores the inputted information in the profile. The profile is associated with user 101 $a \ldots n$ or with subscriber device 110 $a \ldots n$ and is also associated with the channel selected by user 101 $a \ldots n$. The profile may be a text file or a record within a database. The profile is used to filter audio-works and to select an audio-work from collection 214 to replace a filtered song.

In one embodiment, when user 101 $a \ldots n$ wants to listen to/view media, whether it is provided by media source 702 or by one of the user's personalized channels, user 101 $a \ldots n$ may use subscriber device 110 $a \ldots n$ to send a channel-select request to media server 202. The request preferably includes a user-identifier that uniquely identifies user 101 $a \ldots n$ or subscriber device 110 $a \ldots n$.

Figure 11:
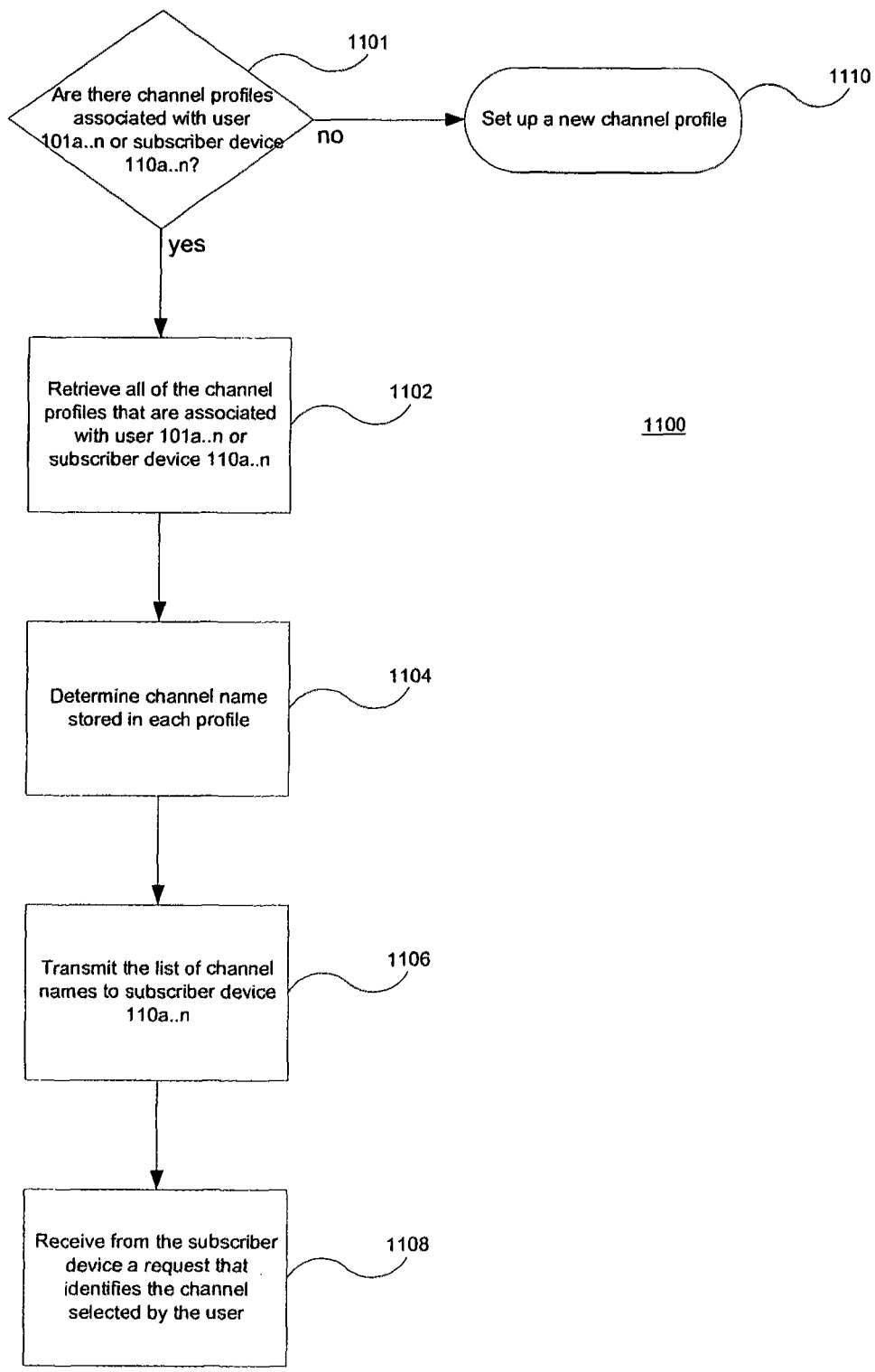
FIG. 11 is a flowchart illustrating a process, according to another embodiment, that is performed by the media server after receiving a channel-select request sent from the subscriber device.

FIG. 11 is a flowchart illustrating a process 1100, according to one embodiment, that is performed by media server 202 after receiving the channel-select request sent from the subscriber device 110 $a \ldots n$. After receiving the request, media server 202 first checks (step 1101) if there are any channel profiles associated with the user 101 $a \ldots n$ or subscriber device 110 $a \ldots n$ making the requests. If there are no channel profiles associated with the user, control passes to step 1110 and then proceeds to display the user interface such as exemplary screen 300 shown in FIG. 3A. Flow continues from exemplary user interface screen 300 as described above. If there are channel profiles associated with the subscriber device 110 $a \ldots n$ or user 101 $a \ldots n$, media server 202 retrieves all of the channel profiles that are associated with user 101 $a \ldots n$ or subscriber device 110 $a \ldots n$ (step 1102), determines the channel name stored in each profile (step 1104), transmits the list of channel names to subscriber device 110 $a \ldots n$ (step 1106), as shown for example in FIG. 6D that are provided by media source 702 (step 1107). Subscriber device 110 $a \ldots n$ displays the received lists using an audio/video system 111 $a \ldots n$. At this point, user 101 $a \ldots n$ selects one of the listed channels, which causes subscriber device 110 $a \ldots n$ to send a request to media server 202.

Figure 12A:
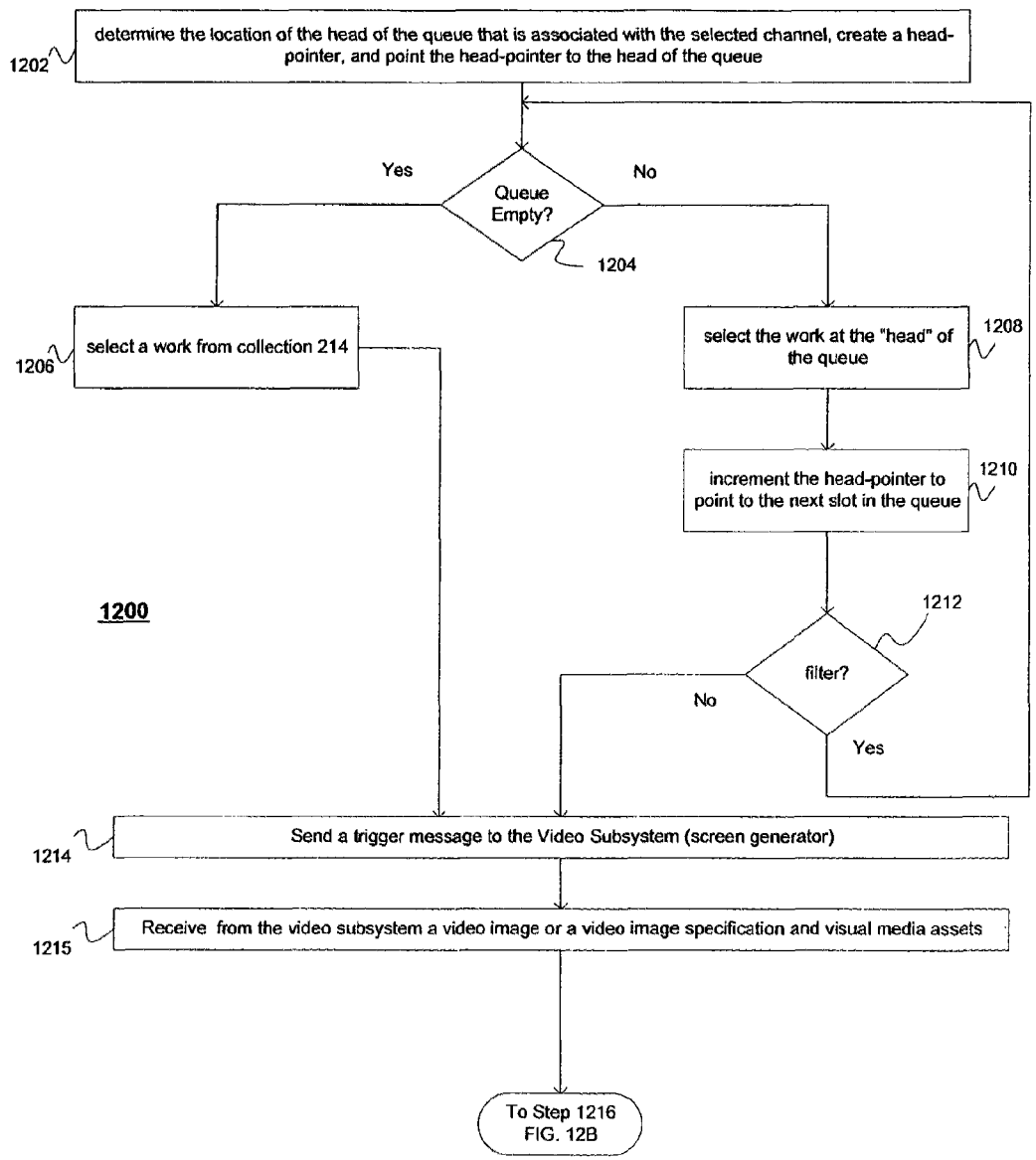
FIGS. 12A and 12B are flow charts illustrating a process, according to another embodiment, performed by the media server in response to receiving a listen-request from the subscriber device.
Figure 12B:
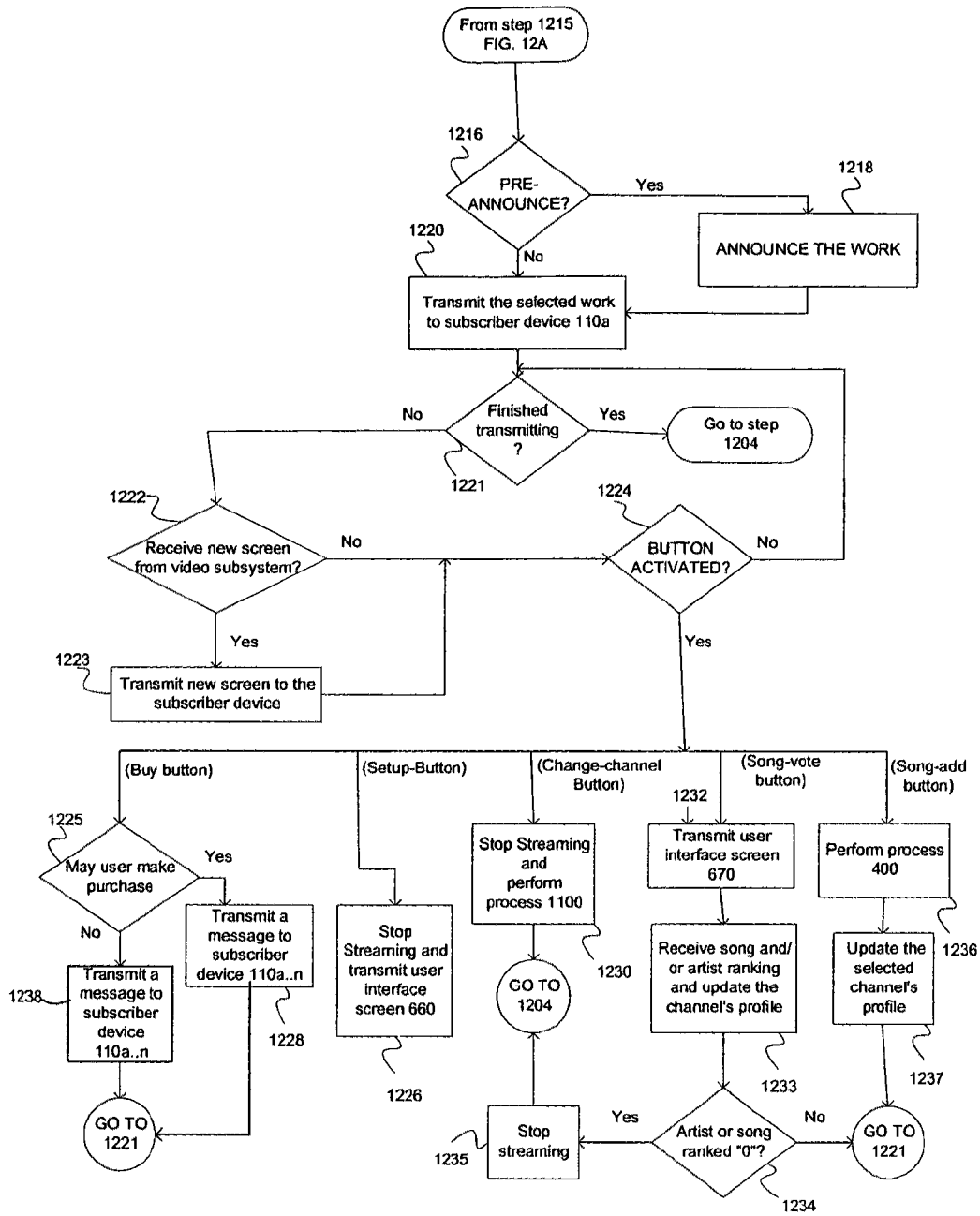

The request includes an identifier that identifies the channel selected by user 101 $a \ldots n$. In step 1108, media server 202 receives the request. FIG. 12, is a flow chart of an embodiment illustrating a process 1200 that is performed by media server 202 in response to the user selecting to utilize a channel provided by media source 702. Once again, it should be understood that while this process is described with respect to a personalized audio channel system for transmitting audio-works, it is equally applicable to personalized channel services for any other media as described above.

Process 1200 begins in step 1202, where media server 202 determines the location of the head of the queue that is associated with the selected channel, creates a head-pointer, and points the head-pointer to the head of the queue. In step 1204, media server 202 determines whether the head of the queue is empty. If the head of the queue is empty, control passes to step 1206; otherwise control passes to step 1208. In step 1206, media server 202 selects a work from collection 214. Preferably, media server 202 selects a work that matches the genre, category, or criteria of the selected channel. Additionally, in selecting a work in step 1206, media server 202 may examine a profile associated with the selected channel and associated with user 101 $a \ldots n$ or subscriber device 110 $a \ldots n$, if there is such a profile. Among other reasons, this is to make sure that the work that is selected is not to be filtered because of the profile. After step 1206, control passes to step 1214.

In step 1208, media server 202 selects the work at the "head" of the queue. That is, media server 202 selects the work that is stored at the buffer location to which the head-pointer is pointing. In step 1210, media server 202 increments the head-pointer to point to the next slot in the queue. In step 1212, media server 202 determines whether or not to filter the selected work. That is, media server 202 determines whether there is stored in storage unit 110 $a \ldots n$ a profile that is associated with the selected channel and that is associated with user 101 *a* . . . *n* or subscriber device 110 *a* . . . *n*. If such a profile exists, then media server 202 determines information associated with the work such as the title, artist, and style of the selected work and determines whether that work is filtered by the profile (e.g., media server 202 determines whether the profile indicates that user 101 *a* . . . *n* does not want to see/hear that work). If media server 202 determines that it should filter the selected work, control passes back to step 1204, otherwise control passes to step 1214.

In step 1214, media server 202 sends a trigger message to video subsystem 208. The message includes an identifier that identifies the selected work (i.e., the work selected in step 1206 or 1208). After receiving the message, video subsystem 208 generates an exemplary user interface screen 600 (see FIG. 6A) that will be displayed to user 101 *a* . . . *n*. Video subsystem 208 then transmits to media server 202 the generated user interface screen. The generated user interface screen is based, at least in part, on the work identified in the trigger message.

In step 1215, media server 202 receives from video subsystem the user interface screen. In step 1216, media server 202 determines whether it can pre-announce the selected work. If it can pre-announce the work, control passes to step 1218, wherein the work is pre-announced; otherwise control passes to step 1220.

In step 1220, media server 202 transmits to subscriber device 110 *a* . . . *n* using transmission system 722 and distribution network 708 the selected work and user interface screen received from video subsystem 208. The work is preferably streamed to the subscriber device, but this is not a requirement. Subscriber device 110 *a* . . . *n*, upon receiving the work streams the work to audio/video system 111 *a* . . . *n* so that user 101 *a* . . . *n* can listen to/view the work. Similarly, upon receiving the exemplary user interface screen, subscriber device 110 *a* . . . *n* transmits the user interface screen to audio/video system 111 *a* . . . *n* so that user 101 *a* . . . *n* can view the screen. At this point, user 101 *a* . . . *n* may select one or more Of the displayed selectable buttons (see FIG. 6A).

In step 1221, media server 202 determines whether the work is finished being transmitted to the subscriber device. If it is, control passes back to step 1204; otherwise control passes to step 1222.

In step 1222, media server 202 determines whether it has received a new user interface screen from video subsystem 208. If it has, control passes to step 1223; otherwise control passes to step 1224. In step 1223, media server 202 transmits the new screen to subscriber device 110 *a* . . . *n*. Video subsystem 208 may create one or more a new screens so that, for example, the advertising banners 656 and/or news and trivia 658 change while the selected work is being transmitted to subscriber device 110 *a* . . . *n*. After step 1223, control passes to step 1224.

In step 1224, media server 202 determines whether user 101 *a* . . . *n* has selected one of the buttons 602-606. If no button is activated and, control passes back to step 1221, otherwise control passes to step 1225, 1226, 1230, 1232, or 1236.

Control passes to step 1225 if buy-button 602 was activated. Control passes to step 1226 if setup-button 603 was activated. Control passes to step 1230 if change-channel button 604 was activated. Control passes to step 1232 if song-vote button 605 was activated. And control passes to step 1236 if song-add button 606 was activated.

In step 1225, media server 202 communicates with a remote server (not shown) to verify that user 101 *a* . . . *n* is qualified to purchase the requested work (e.g., does user 101 *a* . . . *n* have enough money is his or her account). If media server 202 determines that user 101 *a* . . . *n* may purchase the work, control passes to step 1228, otherwise control passes back to step 1238. In step 1238, media server 202 transmits a message to subscriber device 110 *a* . . . *n* informing the user 101 *a* . . . *n* of an invalid purchase qualification. Control then passes to step 1221. In one embodiment, in step 1228, media server 202 transmits a message to the subscriber device that causes the subscriber device to store a copy of the requested work on a non-volatile storage medium to which user 101 *a* . . . *n* has access so that user 101 *a* . . . *n* may access the work whenever user 101 *a* . . . *n* so desires. In another embodiment, in step 1228, media server 202 may transmit a message to fulfillment center (not shown), which fulfills the user's request. The fulfillment center has the capability to fulfill the order by shipping the requests on a variety of media such as CD, tape, any other tangible media.

In step 1226, media server 202 stops streaming the work to subscriber device 110 *a* . . . *n* and transmits exemplary user interface screen 660 (see FIG. 6B) to subscriber device 110 *a* . . . *n*. Alternatively, the work may continuously stream from media server 202 while user interface screen 660 is transmitted. From screen 660 user 101 *a* . . . *n* may modify an existing personalized channel's profile, delete an existing personalized channel, or create a new personalized channel.

In step 1230, media server 202 stops streaming the work to subscriber device 110 *a* . . . *n* and then performs process 1100. After completing process 1100, control passes back to step 1204 where a work is selected based on the selected channel. Alternatively, audio-work transmission may be continuous while the media server 202 performs process 1100.

In step 1232, media server 202 transmits exemplary user interface screen 670 (see FIG. 6C) to subscriber device 110 *a* . . . *n*. From screen 670 user 101 *a* . . . *n* may rate the song and/or the artist as a "+", "−", or "0". In step 1233, media server 202 receives the song and/or artist rating and updates the channel's profile to reflect the song and artist rating received from user 101 *a* . . . *n*. This will be used for future playlist generation. In an embodiment, next (step 1234), media server 202 determines whether the user rated the song or the artist as a "0." If the song or the artist was rated as a "0", then media server 202 optionally stops streaming the song (step 1235); otherwise control passes back to step 1221. After step 1235, control passes to step 1204.

In step 1236, media server 202 performs process 400. After completing process 400, media server 202 updates the selected channel's profile by adding the song to a favorite list within the profile (step 1237). After step 1237, control passes back to step 1221.

Figure 13A:
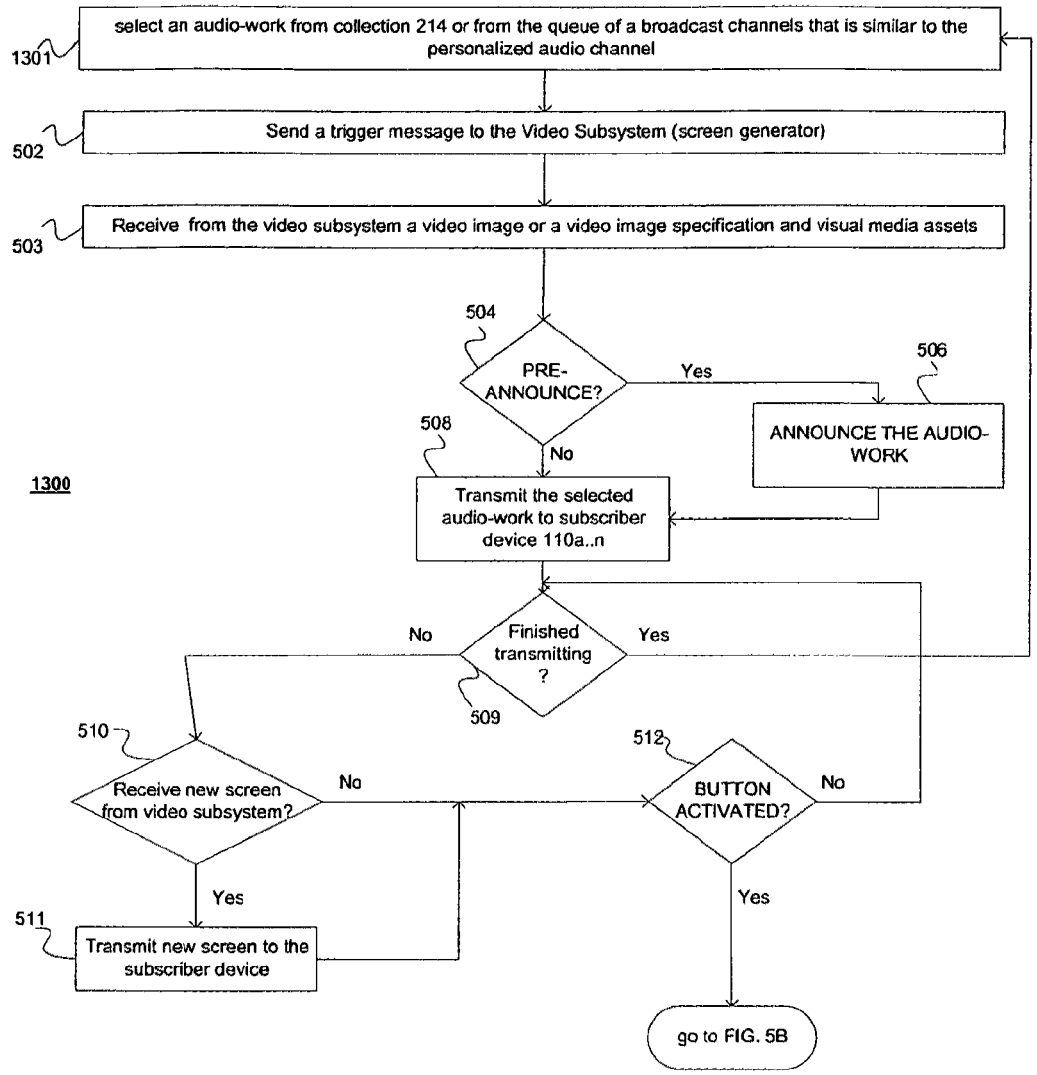
FIGS. 13A and 13B illustrate a process, according to another embodiment, performed by the media server in response to receiving a listen-request from the subscriber device.
Figure 13B:
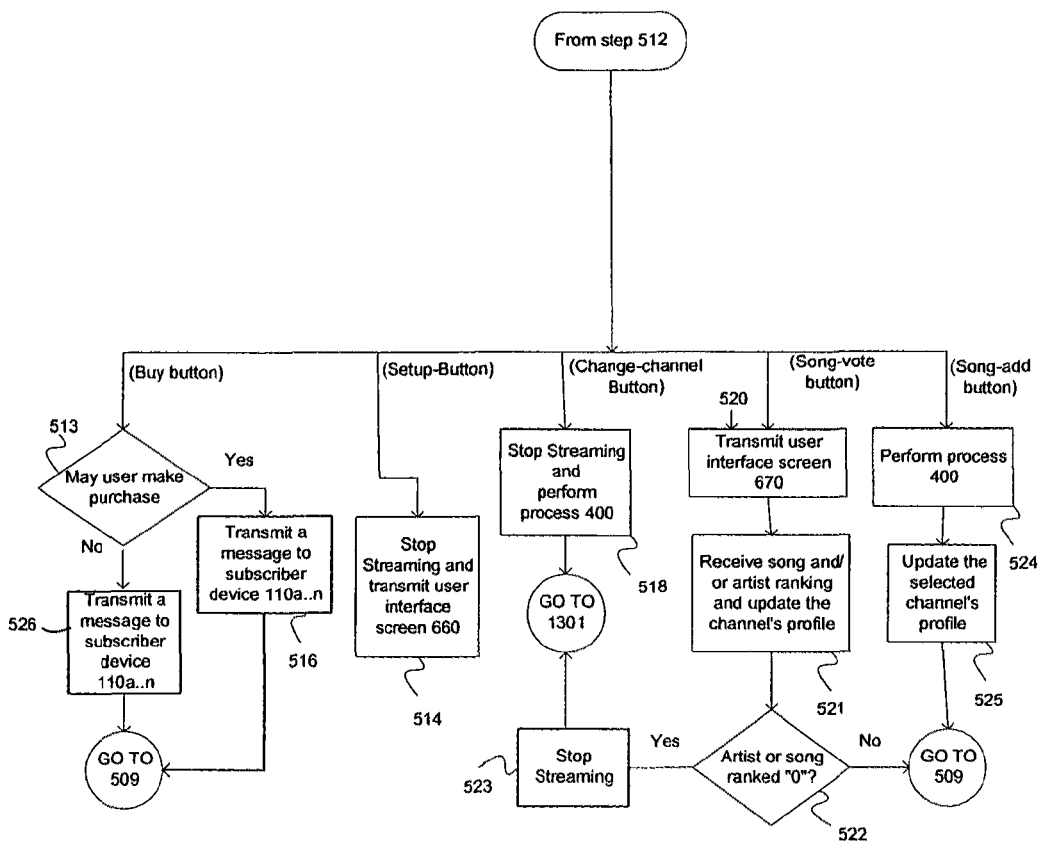

FIGS. 13A and 13B illustrates a process 1300. Process 1300 is a process according to an alternative embodiment of the present invention. Process 1300 is performed by media server 202 in response to user 101 *a* . . . *n* requesting to utilize a selected personalized channel as opposed to a selected broadcast channel provided by media source 702.

Process 1300 is identical to process 500, with the exception that step 1301 replaces step 501. Once again, it should be understood that while this process is described with respect to a personalized audio channel system for transmitting audio-works, it is equally applicable to personalized channel services for any other media as described above. In step 1301, media server 202 selects an audio-work from either (a) collection 214 or (b) a queue within queuing system 902. In one embodiment, media server 202 does not select the audio-work from queuing system 902 unless certain pre-defined conditions are met. For example, media server 202 may select an audio-work from queuing system 902 if an audio-work stored in a queue within queuing system is one that is likely to be enjoyed by user 101 *a* . . . *n* and is not included in collection 214. Additionally, media server 202 may select an audio-work from queuing system 902 if collection 214 does not contain many audio-works that match the profile of the selected personalized audio channel. Thus, queuing system may provide an alternate source of audio-works if media server 202 is unable to select one from collection 214.

FIG. 14 illustrates an example of a user interface screen 1400 associated with an audio channel transmitted by the audio service provider. This example user interface screen 1400 presents an alternative way to access user interface screen 600 from a broadcast channel. Example user interface screen 1400 may be viewable during a standard broadcast and includes several of the same elements that appear on the user interface screen 600 such as buy button 602, song-add button 606, album art work 652, text 654, advertising banner 656, and music news and/or trivia 658. These common elements have the same function and will not be described here again. The reader is directed to the description of FIGS. 5A, 5B, and 6A-6C above for a description of control flow associated with the presentation and use of these common screen elements. The user interface screen 1400 also includes a My Music Choice button 1402. Referring back to FIG. 4, upon activation of the My Music Choice button 1402, control passes to step 401 wherein the system determines if there are pre-existing channel profiles or whether one needs to be created. User interface screen 690 is transmitted and the user may select among the options presented on that screen. Flow continues from the screen 600 as described above. If the user selects "create a new channel" then user interface screen 300 is displayed and flow continues from there as described above.

The user interface screen 1400 may also be utilized in the other embodiments presented above. For example, it may be utilized in conjunction with the embodiment of FIGS. 11-13B. The reader is directed to the description of FIGS. 12A, 12B above for a description of control flow associated with the presentation and use of the common screen elements. Referring back to FIG. 11, upon activation of the My Music Choice button 1402, control passes to step 1101 *a* . . . *n* wherein the user interface screen 690 is transmitted and the user may select among the options presented on that screen. Flow continues from the screen 600 as described above.

While the processes illustrated herein may be described as a series of consecutive steps, none of these processes are limited to any particular order of the described steps. Additionally, it should be understood that the various illustrative embodiments of the present invention described above have been presented by way of example only, and not limitation. Thus, the breadth and scope of the present invention should not be limited by any of the above-described exemplary embodiments, but should be defined only in accordance with the following claims and their equivalents.

What is claimed is:

1. A method for providing a personalized media service, comprising:
    receiving from a user's device a first request that includes an identifier identifying a personalized station;
    using profile information associated with the personalized station, generating a playlist for the personalized station, the playlist comprising information identifying one or more works;
    after generating the playlist, transmitting the playlist to the user's device;
    transmitting to the user's device instructions configured to cause the users device to transmit a second request that includes an identifier identifying one of the one or more works identified in the playlist in response to the user selecting the personalized station;
    after transmitting the instructions to the user's device, receiving from the user's device the second request that includes the identifier identifying one of the one or more works identified in the playlist; and
    in response to receiving the second request, transmitting to the user's device the work identified by the identifier included in the second request, wherein the user can not directly control which works are identified in the playlist.

2. The method of claim 1, further comprising providing computer software for the user's device, wherein the computer software comprises:
    a first set of instructions configured such that when executed by the user's device causes the user's device to transmit the first request to a server in response to the user selecting the personalized station, wherein the identifier included in the first request identifies the selected personalized station;
    a second set of instructions configured such that when executed by the user's device causes the user's device to transmit the second request to a server, wherein the computer software is configured such that the second set of instructions is executed after the user selects the personalized station;
    a set of instructions configured such that when executed by the user's device causes the user's device to play the work in response to the user's device receiving the work;
    a set of instructions configured such that when executed by the user's device causes the user's device to transmit a third request to a server after transmitting the second request but before the work finishes playing, wherein the server is configured to transmit a second work to the user's device in response to the third request;
    a set of instructions configured such that when executed by the user's device causes the user's device to store the second work in a storage unit of the user's device as the second work is being received from the server; and
    a set of instructions configured such that when executed by the user's device causes the user's device to play the second work immediately after the first work finishes playing.

3. The method of claim 2, wherein the computer software further comprises:
    a set of instructions configured such that when executed by the user's device causes the user's device to transmit, before the second work finishes playing but after the first work finished playing, a fourth request to a server, which is configured to transmit a third work to the consumer device in response to the fourth request;
    a set of instructions configured such that when executed by the user's device causes the user's device to store the third work in the storage unit of the consumer device; and
    a set of instructions configured such that when executed by the user's device causes the user's device to play the third work immediately after the second work finishes playing.

4. The method of claim 2, wherein the computer software further comprises:
    a set of instructions configured such that when executed by the user's device causes the user's device to display a dislike button on the display while the first work is being played;
    a set of instructions configured such that when executed by the user's device causes the user's device to perform the following actions immediately in response to the user activating the dislike button: (a) stop playing of the first work, (b) delete the first work from the storage unit, and (c) play the second work.

5. The method of claim 2, wherein the computer software further comprises a set of instructions configured such that when executed by the user's device causes the user's device to delete the first work and the second work from the storage unit in response to the user selecting to listen to another station while the first work is playing.

6. The method of claim 2, wherein
the first work has a title, and
the computer software further comprises a set of instructions configured such that when executed by the user's device causes the user's device to display the title of the first work while the first work is being played, but not display any title associated with the second work until (a) such time as the second work is played or (b) a point in time immediately prior to the playing of the second work.

7. The method of claim 2, wherein the computer software further comprises:
a set of instructions configured such that when executed by the user's device causes the user's device to display on the display a selectable element for enabling the user to indicate that the user would like to create a station; and
a set of instructions configured such that when executed by the user's device causes the user's device to display on the display a user interface that prompts the user to enter one or more artists or songs in response to the user selecting the selectable element.

8. The method of claim 2, wherein the set of instructions for storing the second work in the storage unit of the consumer device comprises computer instructions for protecting the second work so that the user does not have direct access to the second work.

9. The method of claim 1, wherein the playlist comprises information identifying a plurality of works.

10. The method of claim 1, wherein the profile information comprises information identifying one or more styles of music.

11. The method of claim 1, wherein the profile information is further associated with a particular user identifier.

12. The method of claim 11, wherein the profile information includes information identifying works indicated as being disliked by a user associated with the user identifier.

13. The method of claim 11, wherein the profile information includes information identifying works indicated as being preferred by a user associated with the user identifier.

14. A computer system, comprising:
a data processor;
a non-transitory computer readable medium coupled to the data processor; and
computer software stored on the non-transitory computer readable medium, wherein the computer software comprises:
a first set of instructions configured such that when executed by a user's device causes the user's device to transmit a first request to a server in response to the user selecting a personalized station, wherein an identifier included in the first request identifies the selected personalized station;
a second set of instructions configured such that when executed by the user's device causes the user's device to transmit to a server a second request that includes an identifier identifying a work identified in a playlist previously transmitted to the user's device, wherein the computer software is configured such that the second set of instructions is executed after the user selects the personalized station;
a set of instructions configured such that when executed by the user's device causes the user's device to play the work in response to the user's device receiving the work;
a set of instructions configured such that when executed by the user's device causes the user's device to transmit to a server a third request after transmitting the second request but before the work finishes playing, whereby the server is configured to transmit a second work to the user's device in response to the third request;
a set of instructions configured such that when executed by the user's device causes the user's device to store the second work in a storage unit of the user's device as the second work is being received from the server; and
a set of instructions configured such that when executed by the user's device causes the user's device to play the second work immediately after the first work finishes playing.

15. The system of claim 14, wherein the computer software further comprises:
a set of instructions configured such that when executed by the user's device causes the user's device to transmit, before the second work finishes playing but after the first work finished playing, a fourth request to a server, which is configured to transmit a third work to the consumer device in response to the fourth request;
a set of instructions configured such that when executed by the user's device causes the user's device to store the third work in the storage unit of the consumer device; and
a set of instructions configured such that when executed by the user's device causes the user's device to play the third work immediately after the second work finishes playing.

16. The system of claim 14, wherein the computer software further comprises:
a set of instructions configured such that when executed by the user's device causes the user's device to display a dislike button on the display while the first work is being played;
a set of instructions configured such that when executed by the user's device causes the user's device to perform the following actions immediately in response to the user activating the dislike button: (a) stop playing of the first work, (b) delete the first work from the storage unit, and (c) play the second work.

17. The system of claim 14, wherein the computer software further comprises a set of instructions configured such that when executed by the user's device causes the user's device to delete the first work and the second work from the storage unit in response to the user selecting to listen to another station while the first work is playing.

18. The system of claim 14, wherein
the first work has a title, and
the computer software further comprises a set of instructions configured such that when executed by the user's device causes the user's device to display the title of the first work while the first work is being played, but not display any title associated with the second work until (a) such time as the second work is played or (b) a point in time immediately prior to the playing of the second work.

19. The system of claim 14, wherein the computer software further comprises:

a set of instructions configured such that when executed by the user's device causes the user's device to display on the display a selectable element for enabling the user to indicate that the user would like to create a station; and a set of instructions configured such that when executed by the user's device causes the user's device to display on the display a user interface that prompts the user to enter one or more artists or songs in response to the user selecting the selectable element.

20. The system of claim 14, wherein the non-transitory computer readable medium comprises memory for storing data.

21. A method comprising:

storing computer software on a non-transitory computer readable medium;

receiving a message from a user's device;

transmitting the computer software to the user's device in response to the message; and transmitting a plurality of identifiers to the user's device, wherein the computer software comprises:

a first set of instructions configured such that when executed by the user's device causes the user's device to transmit a first request to a server in response to the user selecting a personalized station, wherein an identifier included in the first request identifies the selected personalized station;

a second set of instructions configured such that when executed by the user's device causes the user's device to transmit to a server a second request that includes an identifier identifying a work identified by one of the plurality of identifiers and that causes the server to transmit the work to the user's device, wherein the computer software is configured such that the second set of instructions is executed after the user selects the personalized station;

a set of instructions configured such that when executed by the user's device causes the user's device to play the work in response to the user's device receiving the work transmitted from the server in response to the second request;

a set of instructions configured such that when executed by the user's device causes the user's device to transmit to a server a third request after transmitting the second request but before the work finishes playing, whereby the server is configured to transmit a second work to the user's device in response to the third request;

a set of instructions configured such that when executed by the user's device causes the user's device to store the second work in a storage unit of the user's device as the second work is being received from the server; and a set of instructions configured such that when executed by the user's device causes the user's device to play the second work immediately after the first work finishes playing.

22. The method of claim 21, wherein the computer software further comprises:

a set of instructions configured such that when executed by the user's device causes the user's device to transmit, before the second work finishes playing but after the first work finished playing, a fourth request to a server, which is configured to transmit a third work to the consumer device in response to the fourth request;

a set of instructions configured such that when executed by the user's device causes the user's device to store the third work in the storage unit of the consumer device; and a set of instructions configured such that when executed by the user's device causes the user's device to play the third work immediately after the second work finishes playing.

23. The method of claim 21, wherein the computer software further comprises:

a set of instructions configured such that when executed by the user's device causes the user's device to display a dislike button on the display while the first work is being played;

a set of instructions configured such that when executed by the user's device causes the user's device to perform the following actions immediately in response to the user activating the dislike button: (a) stop playing of the first work, (b) delete the first work from the storage unit, and (c) play the second work.

24. The method of claim 21, wherein the computer software further comprises a set of instructions configured such that when executed by the user's device causes the user's device to delete the first work and the second work from the storage unit in response to the user selecting to listen to another station while the first work is playing.

25. The method of claim 21, wherein the first work has a title, and the computer software further comprises a set of instructions configured such that when executed by the user's device causes the user's device to display the title of the first work While the first work is being played, but not display any title associated with the second work until (a) such time as the second work is played or (b) a point in time immediately prior to the playing of the second work.

26. The method of claim 21, wherein the computer software further comprises:

a set of instructions configured such that when executed by the user's device causes the user's device to display on the display a selectable element for enabling the user to indicate that the user would like to create a station; and a set of instructions configured such that when executed by the user's device causes the user's device to display on the display a user interface that prompts the user to enter one or more artists or songs in response to the user selecting the selectable element.

27. The method of claim 21, wherein the set of instructions for storing the second work in the storage unit of the consumer device comprises computer instructions for protecting the second work so that the user does not have direct access to the second work.

28. The method of claim 21, wherein the non-transitory computer readable medium comprises memory for storing data.

* * * * *